United States Patent
Mendelsohn et al.

(10) Patent No.: US 10,574,342 B2
(45) Date of Patent: Feb. 25, 2020

(54) PAIRED-BEAM TRANSPONDER SATELLITE COMMUNICATION

(71) Applicant: ViaSat, Inc., Carlsbad, CA (US)

(72) Inventors: Aaron J. Mendelsohn, Dana Point, CA (US); Mark J. Miller, San Marcos, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 16/356,641

(22) Filed: Mar. 18, 2019

(65) Prior Publication Data

US 2020/0028574 A1  Jan. 23, 2020

Related U.S. Application Data

(60) Continuation of application No. 15/925,524, filed on Mar. 19, 2018, now Pat. No. 10,284,284, which is a division of application No. 15/432,491, filed on Feb. 14, 2017, now Pat. No. 9,948,381, which is a continuation of application No. 14/952,722, filed on Nov. 25, 2015, now Pat. No. 9,762,308, which is a continuation of application No. 13/843,333, filed on Mar. 15, 2013, now Pat. No. 9,231,692.

(60) Provisional application No. 61/696,717, filed on Sep. 4, 2012.

(51) Int. Cl.
*H04B 7/185* (2006.01)

(52) U.S. Cl.
CPC ................. *H04B 7/18513* (2013.01)

(58) Field of Classification Search
CPC ......... H04W 72/0446; H04W 28/0236; H04W 72/042; H04W 12/02; H04W 24/08; H04W 36/026; H04W 36/08; H04W 36/30; H04W 72/0453; H04W 74/004; H04W 74/006; H04W 88/16; H04B 7/0408; H04B 7/18528; H04B 7/2121
USPC ...................... 455/3.01, 3.02, 12.1, 452.1
See application file for complete search history.

(56) References Cited

U.S. PATENT DOCUMENTS

| | | | |
|---|---|---|---|
| 9,231,692 B2 | 1/2016 | Mendelsohn et al. | |
| 9,762,308 B2 | 9/2017 | Mendelsohn et al. | |
| 9,948,381 B2 | 4/2018 | Mendelsohn et al. | |
| 10,284,284 B2 | 5/2019 | Mendelsohn et al. | |
| 2002/0090942 A1 | 7/2002 | Karabinis et al. | |
| 2005/0118947 A1 | 6/2005 | Ames et al. | |
| 2008/0055151 A1 | 3/2008 | Hudson et al. | |
| 2009/0093213 A1 | 4/2009 | Miller et al. | |

(Continued)

*Primary Examiner* — Tu X Nguyen
(74) *Attorney, Agent, or Firm* — Kilpatrick Townsend & Stockton LLP

(57) ABSTRACT

Systems and methods are described for paired-beam satellite communications in a flexible satellite architecture. Embodiments include one or more "bent pipe" satellites having multiple transponders for servicing a number of spot beams. Implementations include novel types of paired-beam transponders that communicatively couple gateway terminals and user terminals in different spot beams. Some implementations also include loopback transponders that communicatively couple gateway terminals and user terminals in the same spot beam. The transponders can use similar components, can provide for flexible forward-link and return-link spectrum allocation, and/or can provide other features. Certain embodiments further include support for utility gateway terminal service and/or redundancy (e.g., active spares) for one or more active components.

20 Claims, 12 Drawing Sheets

(56) References Cited

U.S. PATENT DOCUMENTS

| | | |
|---|---|---|
| 2009/0270088 A1 | 10/2009 | Fenech et al. |
| 2010/0022186 A1 | 1/2010 | Walley |
| 2010/0226307 A1* | 9/2010 | Harverson ......... H04B 7/18515 370/316 |
| 2011/0189947 A1 | 8/2011 | Miller |
| 2012/0094593 A1 | 4/2012 | Burr |
| 2014/0065950 A1 | 3/2014 | Mendelsohn et al. |
| 2016/0182142 A1 | 6/2016 | Mendelsohn et al. |
| 2017/0214455 A1 | 7/2017 | Mendelsohn et al. |
| 2018/0234168 A1 | 8/2018 | Mendelsohn et al. |

* cited by examiner

PAIRED-BEAM TRANSPONDER SATELLITE COMMUNICATION

CROSS-REFERENCES TO RELATED APPLICATIONS

The present application is a continuation of U.S. Nonprovisional application Ser. No. 15/925,524, filed on Mar. 19, 2018, titled "PAIRED-BEAM TRANSPONDER SATELLITE COMMUNICATION", which is a divisional of U.S. Nonprovisional application Ser. No. 15/432,491, filed on Feb. 14, 2017, titled "PAIRED-BEAM TRANSPONDER SATELLITE COMMUNICATION" and issued as U.S. Pat. No. 9,948,381 on Apr. 17, 2018, which is a continuation of U.S. Nonprovisional application Ser. No. 14/952,722, filed on Nov. 25, 2015, titled "PAIRED-BEAM TRANSPONDER SATELLITE COMMUNICATION" and issued as U.S. Pat. No. 9,762,308 on Sep. 12, 2017, which is a continuation of U.S. application Ser. No. 13/843,333, filed on Mar. 15, 2013, titled "PAIRED-BEAM TRANSPONDER SATELLITE COMMUNICATION" and issued as U.S. Pat. No. 9,231,692 on Jan. 5, 2016, which claims the benefit of and is a non-provisional of U.S. Provisional Application Ser. No. 61/696,717, filed on Sep. 4, 2012, titled "PAIRED-BEAM TRANSPONDER SATELLITE COMMUNICATION," all of which are hereby expressly incorporated herein by reference in their entirety for all purposes.

FIELD

Embodiments relate generally to satellite communications systems, and, more particularly, to paired-beam satellite communications.

BACKGROUND

A satellite communications system typically includes a constellation of one or more satellites that links ground terminals (e.g., gateway terminals and user terminals). For example, the gateway terminals provide an interface with a network such as the Internet or a public switched telephone network, and each gateway terminal services a number of user terminals located in one or more spot beams. Some architectures permit gateway terminals to service user terminals in their own spot beam coverage area via "loopback" beams. Other architectures permit gateway terminals to service user terminals in other spot beam coverage areas. These and other satellite system architectures tend to have limited flexibility in terms of spectrum utilization, gateway terminal location, and other characteristics.

BRIEF SUMMARY

Among other things, systems and methods are described for paired-beam satellite communications in a flexible satellite architecture.

BRIEF DESCRIPTION OF THE DRAWINGS

The present disclosure is described in conjunction with the appended figures.

Figure 1:
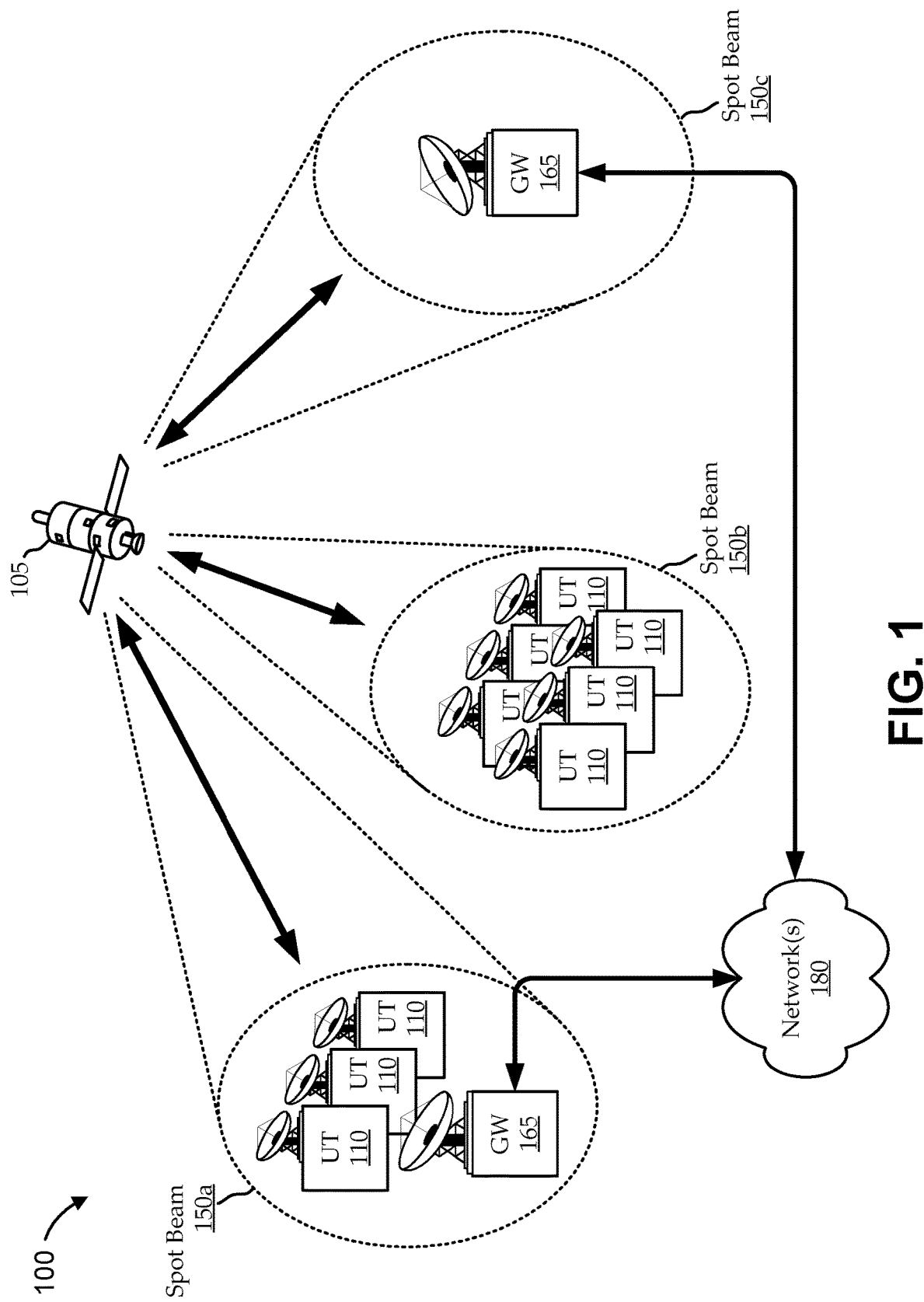
FIG. 1 shows a block diagram of an embodiment of a satellite communications system having a satellite in communication with multiple ground terminals over multiple spot beams, according to various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

Embodiments operate in context of satellite architectures that include one or more satellites (e.g., in different orbital slots) that communicate with many ground terminals (e.g., gateway terminals and user terminals) via multiple spot beams. Design of the satellite architecture can address various types of goals. One such goal is to increase opportunities for frequency reuse. Accordingly, some implementations select geographic placement of gateway terminals, allow user terminals and gateway terminals to use the same spectrum, and/or other employ techniques. Another such goal is to place gateways in reliable locations, for example, where there is less precipitation on average and little interference. Accordingly, some implementations place gateway terminals in locations that may be near user terminals or far from user terminals.

Still, at the time when the satellite architecture is being designed, a number of uncertainties can impact the design. For example, it is typically uncertain which spot beams will need the most capacity (e.g., where the most users will be and/or where the highest bandwidth usage will occur), how the spot beams will be used (e.g., the ratio of forward-link versus return-link traffic), etc. These uncertainties can impact spectrum utilization. Accordingly, implementations of the satellite architecture are designed to permit flexibility in spectrum utilization. For example, the satellite or satellites in the architecture can communicate with both gateway terminals and user terminals over the same spectrum at the same time, and various techniques can be used to allocate portions of that spectrum for forward-link and return-link traffic.

Embodiments include one or more "bent pipe" satellites having multiple transponders (e.g., and corresponding feeds) for servicing a number of spot beams. Some transponders are paired-beam transponders that communicatively couple gateway terminals and user terminals in different spot beams. Some embodiments also include loopback transponders that communicatively couple gateway terminals and user terminals in the same spot beam. In some implementations, the paired-beam transponders and loopback transponders use similar components, which can, for example, simplify the satellite design and facilitate other features (e.g., certain types of component redundancy, etc.). Some embodiments also selectively facilitate utility gateway terminal service (e.g., in the event of a gateway terminal outage). Certain embodiments further include techniques for providing redundancy (e.g., active spares) for one or more active components. Some such embodiments provide active spares in context of also providing utility gateway functionality.

Turning first to FIG. 1, a block diagram is shown of an embodiment of a satellite communications system 100 having a satellite 105 in communication with multiple ground terminals over multiple spot beams 150, according to various embodiments. Embodiments of the satellite 105 are designed as "bent pipe" satellites. The satellite 105 can communicate with the ground terminals according to any suitable communications architecture, such as a hub-spoke architecture. In some implementations, some ground terminals are in substantially fixed locations (e.g., at a residential or enterprise subscriber's premises), and other ground terminals are mobile terminals. Further, the term "ground" is used herein generally in contrast to the portions of the network in "space" (i.e., the satellites 105). For example, embodiments of the ground terminals can include mobile aircraft terminals and the like.

For the sake of illustration, three spot beams 150 are shown having different compositions of ground terminals. A first spot beam 150a covers an area including both a gateway terminal 165 and multiple user terminals 110 (typically many, though only three are shown for clarity). A second spot beam 150b covers an area that includes only user terminals 110, and a third spot beam 150c covers an area that includes only a gateway terminal 165. Gateway terminals 165 can perform various functions, such as scheduling traffic to user terminals 110, synchronizing communications with one or more satellites 105, coding and/or modulation (and decoding and/or de-modulation) of traffic to and from the satellite 105, etc. Some embodiments also include various ground segment or other systems. For example, geographically distributed backhaul nodes are in communication with public and/or private networks (e.g., the Internet), with multiple gateway terminals 165 (e.g., redundantly), and with each other via a high-speed, high-throughput, high-reliability terrestrial backbone network, and can perform enhanced routing, queuing, scheduling, and/or other functionality. The various ground segment components can be communicatively coupled via any suitable type of network, for example, an Internet Protocol (IP) network, an intranet, a wide-area network (WAN), a local-area network (LAN), a virtual private network (VPN), a public switched telephone network (PSTN), a public land mobile network, a cellular network, and/or other wired, wireless, optical, or other types of links.

Each gateway terminal 165 and user terminal 110 can have an antenna that includes a reflector with high directivity in the direction of the satellite 105 and low directivity in other directions. The antennas can be implemented in a variety of configurations and can include features, such as high isolation between orthogonal polarizations, high efficiency in the operational frequency bands, low noise, and the like. In one embodiment, a user terminal 110 and its associated antenna together comprise a very small aperture terminal (VSAT) with the antenna having a suitable size and having a suitable power amplifier. Some embodiments of gateway terminals 165 include larger antennas with higher power than those of the user terminals 110. In other embodiments, a variety of other types of antennas are used to communicate with the satellite 105.

Each antenna is configured to communicate with the satellite 105 via a spot beam 150 (e.g., a fixed-location beam or other type of beam). For example, each antenna points at the satellite 105 and is tuned to a particular frequency band (and/or polarization, etc.). The satellite 105 can include one or more directional antennas for reception and transmission of signals. For example, a directional antenna includes a reflector with one or more feed horns for each spot beam. Typically, the satellite communications system 100 has limited frequency spectrum available for communications. Contours of a spot beam 150 can be determined in part by the particular antenna design and can depend on factors, such as location of feed horn relative to a reflector, size of the reflector, type of feed horn, etc. Each spot beam's contour on the earth can generally have a conical shape (e.g., circular or elliptical), illuminating a spot beam 150 coverage area for both transmit and receive operations. A spot beam 150 can illuminate terminals that are on or above the earth surface (e.g., airborne terminals, etc.). In some embodiments, directional antennas are used to form fixed-location spot beams (or spot beams that are associated with substantially the same spot beam coverage area over time). Certain embodiments of the satellite 105 operate in a multiple spot-beam mode, receiving and transmitting a number of signals in different spot beams (e.g., of the same or different types). Each spot beam can use a single carrier (i.e., one carrier frequency), a contiguous frequency range (i.e., one or more carrier frequencies), or a number of frequency ranges (with one or more carrier frequencies in each frequency range). Some embodiments of the satellite 105 are non-regenerative, such that signal manipulation by the satellite 105 provides functions, such as frequency translation, polarization conversion, filtering, amplification, and the like, while omitting data demodulation and/or modulation and error correction decoding and/or encoding.

As used herein, the term spot beam 150 can generally refer to a geographic coverage area within a beam or the beams themselves. For example, a spot beam 150 can support one or more gateway uplink beams, gateway downlink beams, user uplink beams, user downlink beams, etc. Each type of beam may or may not support forward-channel and return-channel traffic. For example, in a hub-spoke configuration, forward-channel traffic travels from a gateway terminal 165 to a satellite 105 via a gateway uplink beam, and from the satellite 105 to a user terminal 110 via a user downlink beam; and return-channel traffic travels from the user terminal 110 to the satellite 105 via a user uplink beam, and from the satellite 105 to the gateway terminal 165 via a gateway downlink beam. In some implementations, the different beams use different geographic locations, carrier frequencies, polarizations, communications timing, and/or other techniques to avoid inter-beam interference.

A given beam can typically service many ground terminals. For example, a "user" beam can be used to service many user terminals 110, and a "gateway" beam can be used to service a gateway terminal 165 and any user terminals 110 in the coverage are of the beam. The various user beams and gateway beams can use the same, overlapping, or different frequencies, polarizations, etc. In some embodiments, some or all gateway terminals 165 are located away from the user terminals 110, which can facilitate frequency re-use. In other embodiments, some user terminals 110 are located near some or all gateway terminals 165. While the satellite communications system 100 can support very large numbers of ground terminals via large numbers of spot beams 150, only three spot beams are shown for clarity.

As described herein, various implementations can exploit this configuration of spot beams 150 and gateway terminals 165. For example, the gateway terminal 165 in the first spot beam 150a can service user terminals 110 in its own spot beam 150a via a "loopback beam" and/or user terminals 110 in another spot beam (e.g., those in spot beam 150b) via a "paired beam." The gateway terminal 165 in the third spot beam 150c can service user terminals 110 in one or more other spot beams (e.g., those in spot beam 150a and/or spot beam 150b) via one or more paired beams. For example, depending on the composition of ground terminals and the type of communications employed by associated gateway terminals 165, a spot beam 150 can be a loopback beam, a paired user beam, a paired gateway beam, etc. In some implementations, each gateway terminal 165 includes two or more antennas to facilitate communications with multiple transponders on one or more satellites 105. Each antenna can support communications on multiple frequency bands and/or polarities. For example, forward-channel uplink traffic can be sent on a first portion of an uplink frequency band in a first polarity, return-channel uplink traffic can be sent on a second portion of the uplink frequency band in a second polarity, forward-channel downlink traffic can be sent on a first portion of a downlink frequency band in the second polarity, and return-channel downlink traffic can be sent on a second portion of the downlink frequency band in the first polarity. Allowing the gateway terminals 165 and user terminals 110 to share the same spectrum can facilitate frequency reuse.

Figure 2:
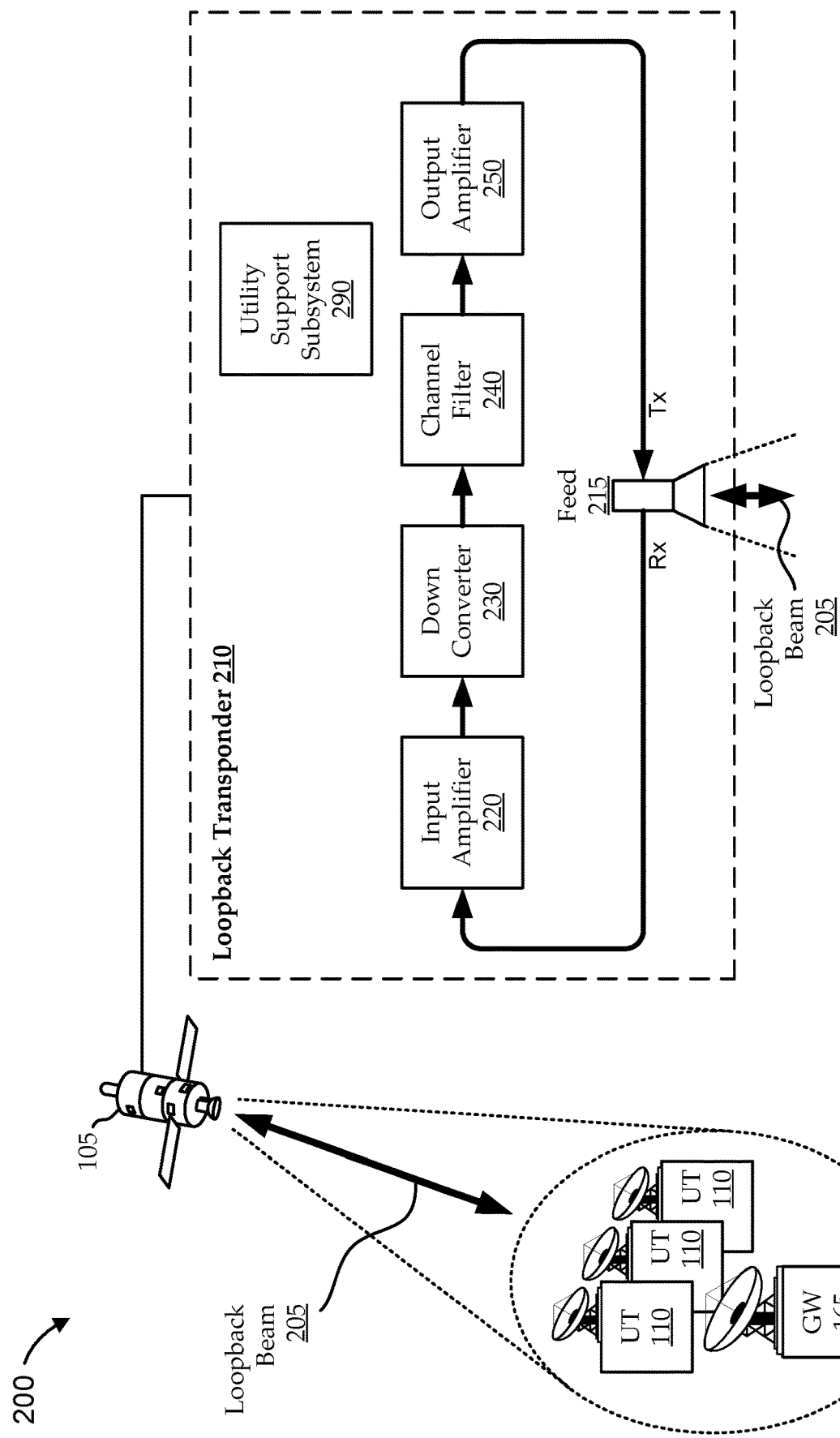
FIG. 2 shows a partial satellite communications system with an illustrative loopback transponder, according to various embodiments.

FIG. 2 shows a partial satellite communications system 200 with an illustrative loopback transponder 210, according to various embodiments. For the sake of clarity, a single satellite 105 is shown in communication with both user terminals 110 and a gateway terminal 165 in a single loopback beam 205 coverage area. The loopback beam 205 is configured so that the user terminals 110 and the gateway terminal 165 share the same spectrum concurrently. This permits frequency reuse across the ground terminals in the coverage area and allows scheduling functions (e.g., of the gateway terminal 165) to allocate forward-channel and return-channel capacity in a flexible (e.g., and dynamic) manner. Further, as described below, embodiments include support for a utility gateway via components of a utility support subsystem 290. For example, one utility support subsystem 290 can selectively couple a utility gateway, as needed, with multiple loopback transponders 210 (and/or paired beam transponders, as described below).

For example, the user terminals 110 and the gateway terminal 165 can concurrently transmit uplink traffic to the satellite 105 via the loopback beam 205 at an uplink (or received (Rx)) frequency band, and they can concurrently receive downlink traffic from the satellite 105 via the loopback beam 205 at a downlink (or transmitted (Tx)) frequency band. At each of the uplink and downlink frequency bands, a surrounding swath of frequency can be allocated flexibly to forward-channel and return-channel traffic. For example, each beam is allocated a frequency band between about 27.5 and 30 Gigahertz as the uplink band and between about 17.7 and 20.2 Gigahertz as the downlink band. Each of these 2.5-Gigahertz bands can be further allocated in a flexible manner for forward-channel or return-channel traffic. For example, the resulting forward-channel and return-channel communications can share spectrum and/or power according to any suitable scheme, including, for example, by having allocated sub-bands of any suitable size (e.g., contiguous or non-contiguous, overlapping or non-overlapping, adjacent or non-adjacent, etc.), or by using spread spectrum or other techniques (e.g., code division, etc.).

Communications over the loopback beam 205 are facilitated by the loopback transponder 210. For example, communications from the user terminals 110 and the gateway terminal 165 are received by a satellite feed 215 in communication with the loopback beam 205, processed by the loopback transponder 210, and transmitted back to the same user terminals 110 and gateway terminal 165 via the feed 215 (or another feed or feed port in communication with the loopback beam 205). The loopback transponder 210 can include any suitable receive and transmit components for handling the loopback communications.

As used herein, a "feed" generally refers to the components for interfacing the satellite 105 with a beam (e.g., loopback beam 205). For example, each feed can include an antenna, reflector, feed horn, etc. In some implementations, each feed includes at least one transmit port and at least one receive port. For example, a feed can include an orthomode transducer (OMT) or the like for receiving and transmitting at multiple polarizations (e.g., right-hand circular polarization (RHCP) and left-hand circular polarization (LHCP)), so that the feed includes at least a first port for receiving at a first polarization, a second port for receiving at a second polarization, a third port for transmitting at the first polarization, and a fourth port for transmitting at the second polarization. Each transponder (e.g., loopback transponder 210) can be in communication with one of the receive ports and one of the transmit ports (e.g., at opposite polarizations).

As illustrated, the loopback transponder 210 includes an input amplifier 220, a down-converter 230, a channel converter 240, and an output amplifier 250. Uplink traffic is received from the ground terminals by the feed 215, processed by the input amplifier 220, down-converter 230, channel converter 240, and output amplifier 250 into appropriate downlink traffic, and transmitted back to the ground terminals via the feed 215. In some implementations, the input amplifier 220 is a low-noise amplifier (LNA) or the like. The input amplifier can include any other suitable filters, attenuators, or other components to facilitate receipt of traffic in a desired manner. The down-converter 230 can convert the traffic received in the uplink band into traffic for transmitting in the downlink band. For example, the down-converter 230 effectively performs a 9.8-Gigahertz translation of the received signal (e.g., the 27.5-30 Gigahertz uplink traffic is translated to 17.7-20.2 Gigahertz downlink traffic). Embodiments of the channel converter 240 can perform various functions, such as frequency conversion relating to channels having particular dedicated frequency sub-bands. The output signal can then be amplified as appropriate for communication back to the ground terminals. In some implementations, the output amplifier 250 includes a high-power amplifier (HPA), like a traveling wave tube amplifier (TWTA) or the like. Other implementations of the loopback transponder 210 can include additional components without departing from the scope of embodiments.

For the sake of illustration, embodiments of loopback transponders 210, like those described with reference to FIG. 2, can be used to implement various methods. An illustrative method begins by receiving a gateway uplink signal by a loopback transponder of the satellite from a first gateway terminal via a loopback beam on an uplink frequency band. A second user uplink signal is received by the loopback transponder from a group of user terminals via the loopback beam on the uplink frequency band. The second group of user terminals is located in the same spot beam coverage area as the first gateway. For example, the gateway and user uplink signals can be received concurrently as a combined input signal in a non-coherent fashion. The combined input signal can be amplified and converted at to a combined output signal at a downlink frequency band that is different from the uplink frequency band. The combined output signal can be transmitted to the first gateway terminal via the loopback beam on the downlink frequency band, and the combined output signal can be transmitted to the group of user terminals via the loopback beam on the downlink frequency band.

Figure 3A:
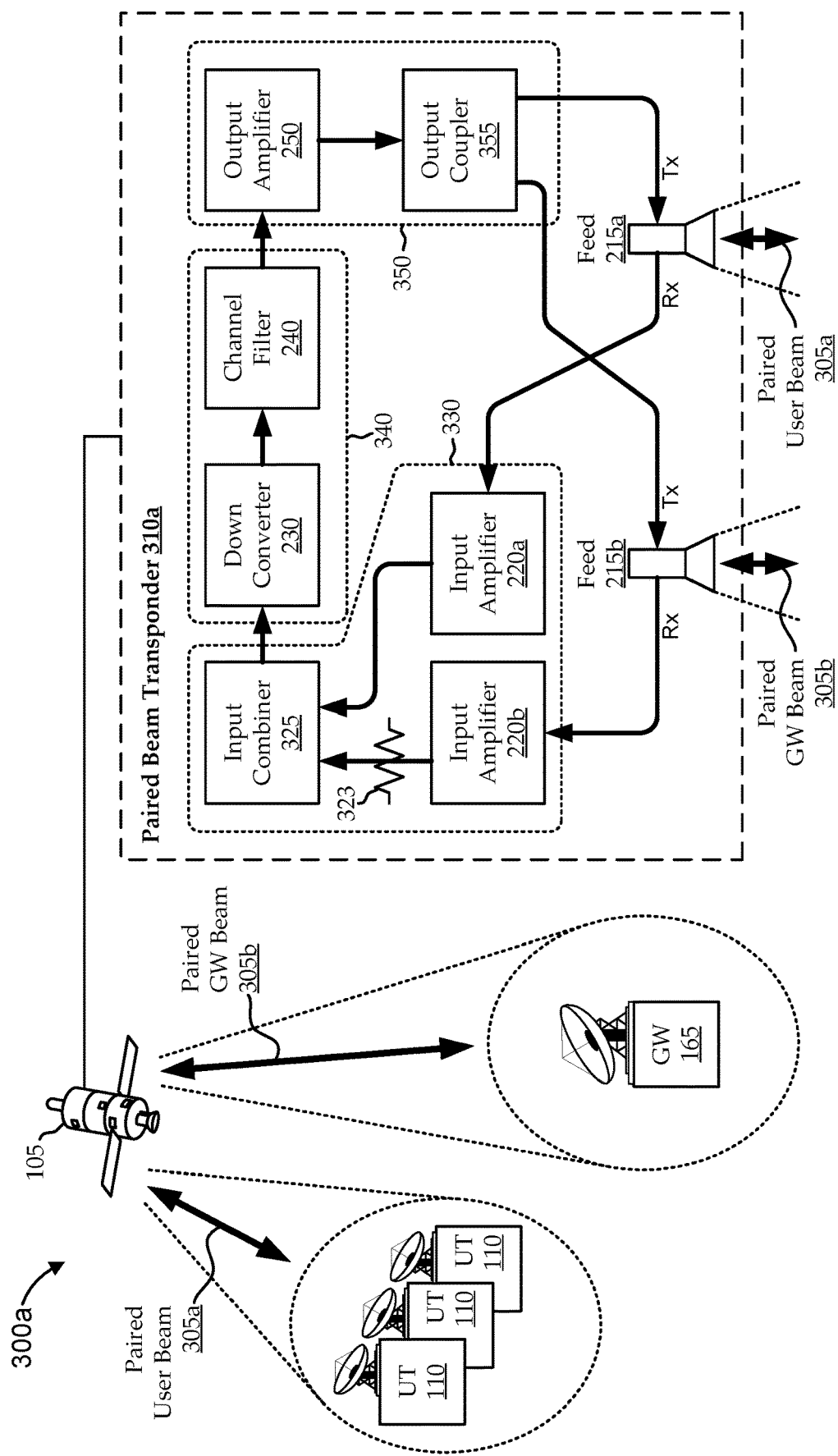
FIG. 3A shows a partial satellite communications system with an illustrative paired-beam transponder, according to various embodiments.

FIG. 3A shows a partial satellite communications system 300a with an illustrative paired-beam transponder 310a, according to various embodiments. For the sake of clarity, a single satellite 105 is shown in communication with user terminals 110 in a first spot beam coverage area serviced by a gateway terminal 165 in a second spot beam coverage area via respective paired beams 305. As illustrated, the "paired beam" includes the beam over which the user terminals 110 communicate with the satellite 105 (a "paired user beam" 305a) and the beam over which the gateway terminal 165 communicates with the satellite 105 (a "paired gateway beam" 305b). Embodiments handle the paired beam 305 in a similar manner as the loopback beam 205 described in FIG. 2. For example, though in two separate spot beams, the user terminals 110 and the gateway terminal 165 can share the same spectrum concurrently, thereby permitting frequency reuse and flexible spectrum allocation. Further, embodiments of the paired-beam transponder 310 have a similar architecture to that of embodiments of the loopback transponder 210.

For example, the user terminals 110 and the gateway terminal 165 can concurrently transmit uplink traffic to the satellite 105 via their respective paired beams 305 at an uplink frequency band, and they can concurrently receive downlink traffic from the satellite 105 via their respective paired beams 305 at a downlink frequency band. At each of the frequency bands, a surrounding swath of frequency can be allocated flexibly to forward-channel and return-channel traffic. In some implementations, the spectrum is assigned similarly or identically to the manner in which it is assigned in the loopback beam context described with reference to FIG. 2. Each of the assigned bands can be allocated in a flexible manner for forward-channel or return-channel traffic.

Communications over the paired beams 305 are facilitated by the paired-beam transponder 310a. For example, communications from the user terminals 110 are received by a first satellite feed 215a in communication with the paired user beam 305a, and communications from the gateway terminal 165 are received by a second satellite feed 215b in communication with the paired gateway beam 305b. The received communications are processed by the paired-beam transponder 310a and transmitted back to the same user terminals 110 and gateway terminal 165 over their respective paired beams 305 via the respective feeds 215 (or other feeds 215 in communication with the paired beams 305). The paired-beam transponder 310a can include any suitable receive and transmit components for handling the paired-beam communications.

As in the loopback transponder 210 of FIG. 2, the paired-beam transponder 310a includes input amplifiers 220, a down-converter 230, a channel converter 240, and an output amplifier 250. Embodiments of the paired-beam transponder 310a further include an input combiner 325, an output coupler 355, an input attenuator 323, and an output terminator 353. Uplink traffic is received from the ground terminals by the respective feeds 215; amplified by respective input amplifiers 220; combined by the input combiner 325 (and attenuated by the input attenuator 323 as appropriate); further processed into appropriate downlink traffic by the down-converter 230, channel converter 240, output amplifier 250, and output coupler 355 (with coupling gain as appropriate); and transmitted back to the ground terminals via the respective feeds 215.

Some implementations include a user-side input amplifier 220a coupled with a user-side feed 215a, and a gateway-side input amplifier 220b coupled with a gateway-side feed 215b. Each input amplifier 220 can include a low-noise amplifier (LNA) and/or any other suitable filters, attenuators, or other components to facilitate receipt of traffic in a desired manner. Typically, even if received on the same uplink band, the user traffic and gateway traffic can differ in power, polarization, G/T (a measure of noise level received at the satellite in terms of the receive antenna gain (G) and the system noise temperature (T)), etc. Accordingly, some implementations of the user-side input amplifier 220a are identical or similar to implementations of the gateway-side input amplifier 220b, and may or may not be tailored to the particular characteristics of their respective received signals.

Embodiments of the paired-beam transponder 310a combine the signals received via the paired user beam 305a and the paired gateway beam 305b (and amplified via their respective input amplifiers 220) using the input combiner 325. The input combiner 325 can include a summer, directional coupler, hybrid coupler, and/or any other suitable component. Some implementations combine the signals without additional processing (e.g., attenuation). According to some implementations, the gateway and user signals are not coherent, so that they can be readily combined.

Because the user and gateway signals typically have different respective G/T values, simply combining the signals can add noise to the combined signal (e.g., roughly three decibels of added noise in some implementations). Accordingly, some embodiments include the input attenuator 323 to provide more effective signal matching and combining. For example, attenuating the gateway-side signal prior to combining it with the user-side signal can appreciably reduce the thermal noise contribution from the gateway signal thereby improving the signal-to-noise ratio of the user signal. The respective G/T values for the user and gateway signals can be calculated according to the following equations:

$$\left(\frac{G}{T}\right)_{User} = \left(\frac{G}{T}\right)_{User\_Antenna} * \frac{A}{1+A}$$

-continued $$\left(\frac{G}{T}\right)_{GW} = \left(\frac{G}{T}\right)_{GW\_Antenna} * \frac{1}{1+A}$$

where A is the attenuation provided by the input attenuator 323. For example, the input attenuator 323 can be configured to provide at least five decibels of attenuation to the gateway input signal.

The down-converter 230 can convert the combined signal into traffic for transmitting in the downlink band. For example, the down-converter 230 and channel converter 240 can perform frequency translation and/or filtering functions, such as 9.8-Gigahertz translation of the received signal, channel frequency sub-band conversion, etc. The output signal can then be amplified as appropriate for communication back to the ground terminals, for example, using a high-power amplifier (HPA), like a traveling wave tube amplifier (TWTA) or the like. Unlike in the loopback transponder 210 embodiments described above, the paired-beam transponder 310a prepares the combined and processed output signal for communication over the user-side feed 215a and the gateway-side feed 215b using appropriate gains, etc.

In some embodiments, the output coupler 355 sends the output signal to both feeds 215 and the coupling level can be selected to provide a higher power version of the output signal to the user-side feed 215a than to the gateway-side feed 215b. In one implementation, the output coupler 355 is a passive coupler with a "through" port coupling the output of the output amplifier 250 with the user feed 215a, and a "couple" port coupling the output of the output amplifier 250 with the gateway feed 215b. An output terminator is coupled with an otherwise unused input to the couple port. For example, a six-decibel output coupler 355 can apply approximately −1.25 decibel of gain to the user-side downlink signal and can apply approximately −6 decibels of gain to the gateway-side downlink signal. This allows the signal to be appropriately powerful for receipt by user terminals 110, which can typically have smaller, lower power antennas (e.g., in fixed size, fixed power terminals).

Embodiments of the transponders described herein can be considered as generally including an input subsystem 330, a frequency translation subsystem 340, and an output subsystem 350. In the paired-beam transponder 310a of FIG. 3A, the input subsystem 330 includes the input amplifiers 220, the input combiner 325, and the input attenuator 323; the frequency translation subsystem 340 includes the down-converter 230 and the channel filter 240; and the output subsystem 350 includes the output amplifier 250 and the output coupler 355. Other implementations of transponders, including other paired-beam transponders 310, can include additional components and/or the same components in different orders or arrangements, without departing from the scope of embodiments.

Figure 3B:
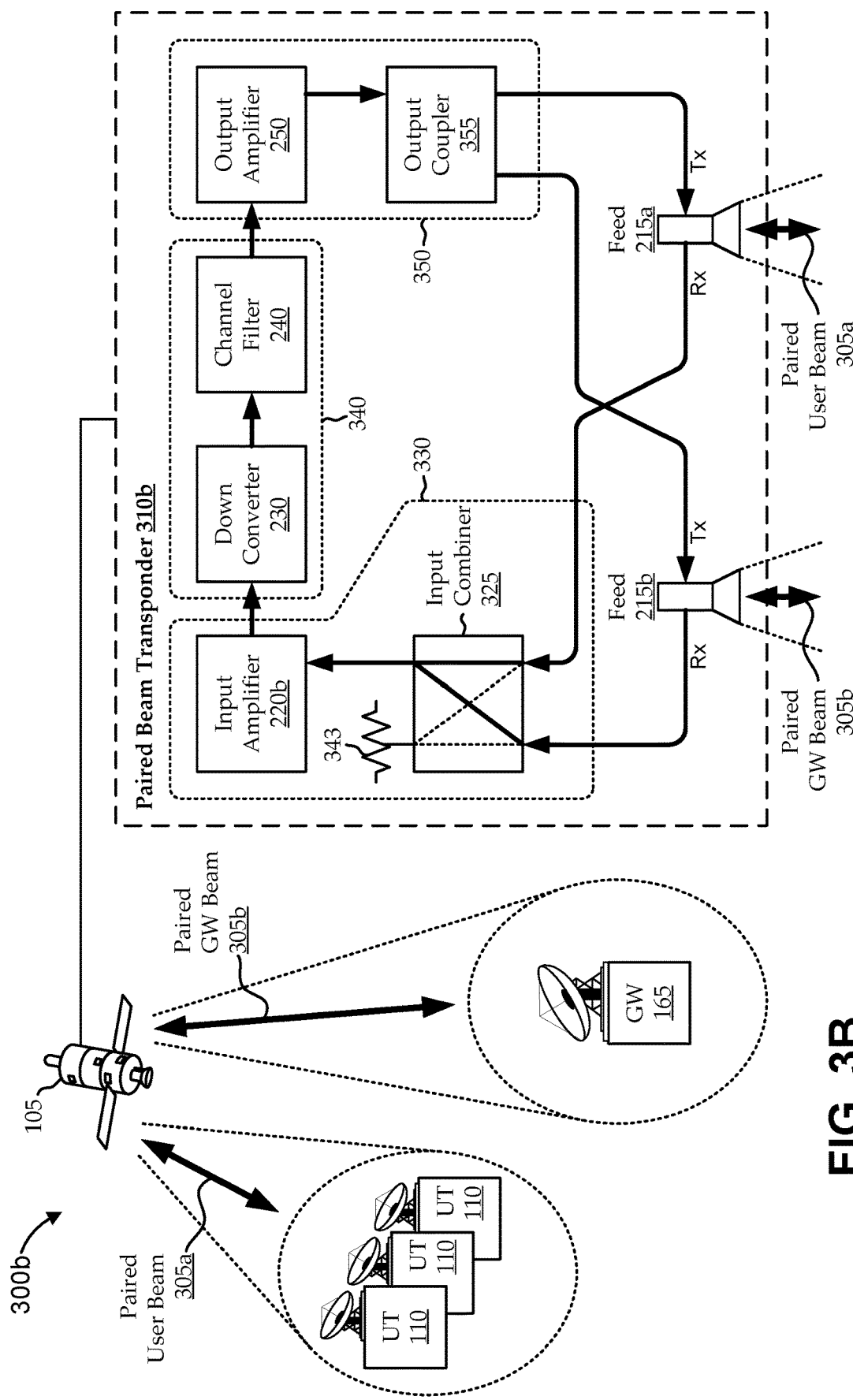
FIG. 3B shows a partial satellite communications system with another illustrative paired-beam transponder, according to various embodiments.

FIG. 3B shows a partial satellite communications system 300b with another illustrative paired-beam transponder 310b, according to various embodiments. As described above, communications from the user terminals 110 are received by a first satellite feed 215a in communication with the paired user beam 305a, and communications from the gateway terminal 165 are received by a second satellite feed 215b in communication with the paired gateway beam 305b. The received communications are processed by the paired-beam transponder 310b and transmitted back to the same ground terminals over their respective paired beams 305 via the respective feeds 215. FIG. 3B shows an input subsystem 330, a frequency translation subsystem 340, and an output subsystem 350. The frequency translation subsystem 340 and output subsystem 350 of FIG. 3B are similar or identical to those described with reference to FIG. 3A. The input subsystem 330 of the paired-beam transponder 310b of FIG. 3B includes only one input amplifier 220 located prior to the input combiner 325 in the feeder path. For example, uplink traffic is received from the ground terminals by the respective feeds 215; amplified by respective input amplifiers 220; combined by the input combiner 325; further processed into appropriate downlink traffic by the down-converter 230, channel converter 240, output amplifier 250, and output coupler 355; and transmitted back to the ground terminals via the respective feeds 215. For the sake of added clarity, the description focuses only on the portions of FIG. 3B that differ from FIG. 3A.

Unlike in FIG. 3A, the paired-beam transponder 310b is illustrated with its input combiner 325 prior to the input amplifier 220 in the input signal path. Combining the input signals prior to amplifying them manifests certain differences as compared to the embodiments of FIG. 3A. One such difference is that the combined input signal can be amplified by a single input amplifier 220 in FIG. 3B, rather than using separate input amplifiers 220 to amplify the separate input signals, as in FIG. 3A. Another such difference is that the input combiner 325 of FIG. 3B operates on the non-amplified, received signals, rather than operating on the amplified input signals as in FIG. 3A. In one implementation, the input combiner 325 is implemented as a passive coupler with its "through" port coupling the output of the user feed 215a to the input of the input amplifier 220, and its "couple" port coupling the output of the gateway feed 215b to the input of the input amplifier 220. An input terminator 343 is coupled with an otherwise unused output to the couple port. For example, the input combiner 325 is implemented as a six-decibel passive coupler that applies approximately −1.25 decibels of gain to the received user-side uplink signal and applies approximately −6 decibels of gain to the received gateway-side uplink signal. This can effectively add approximately 1.25 decibels of noise to the user-side uplink signal during the combination. Accordingly, as compared to FIG. 3A, the implementation of FIG. 3B reduces hardware and complexity at the expense of decreased G/T performance.

For the sake of illustration, embodiments of paired-beam transponders 310, like those described with reference to FIGS. 3A and 3B, can be used to implement various methods. An illustrative method begins by receiving a gateway uplink signal by a paired-beam transponder of a satellite from a first gateway terminal via a paired gateway beam on an uplink frequency band. The first gateway terminal is located in a first spot beam coverage area. A user uplink signal is received by the paired-beam transponder from a first group of user terminals via the paired user beam on the uplink frequency band. The first group of user terminals is located in a second spot beam coverage area that does not overlap with the first spot beam coverage area. For example, the gateway and user uplink signals can be received concurrently in a non-coherent fashion. The gateway uplink signal and the user uplink signal can be amplified and combined into a combined input signal using the paired-beam transponder (e.g., the amplifying can be performed before or after the combining). The combined input signal can be converted to a combined output signal at a downlink frequency band that is different from the uplink frequency band. The combined output signal can be transmitted to the first gateway terminal via the paired gateway beam on the downlink frequency band, and the combined output signal can be transmitted to the first group of user terminals via the paired user beam on the downlink frequency band.

Figure 4:
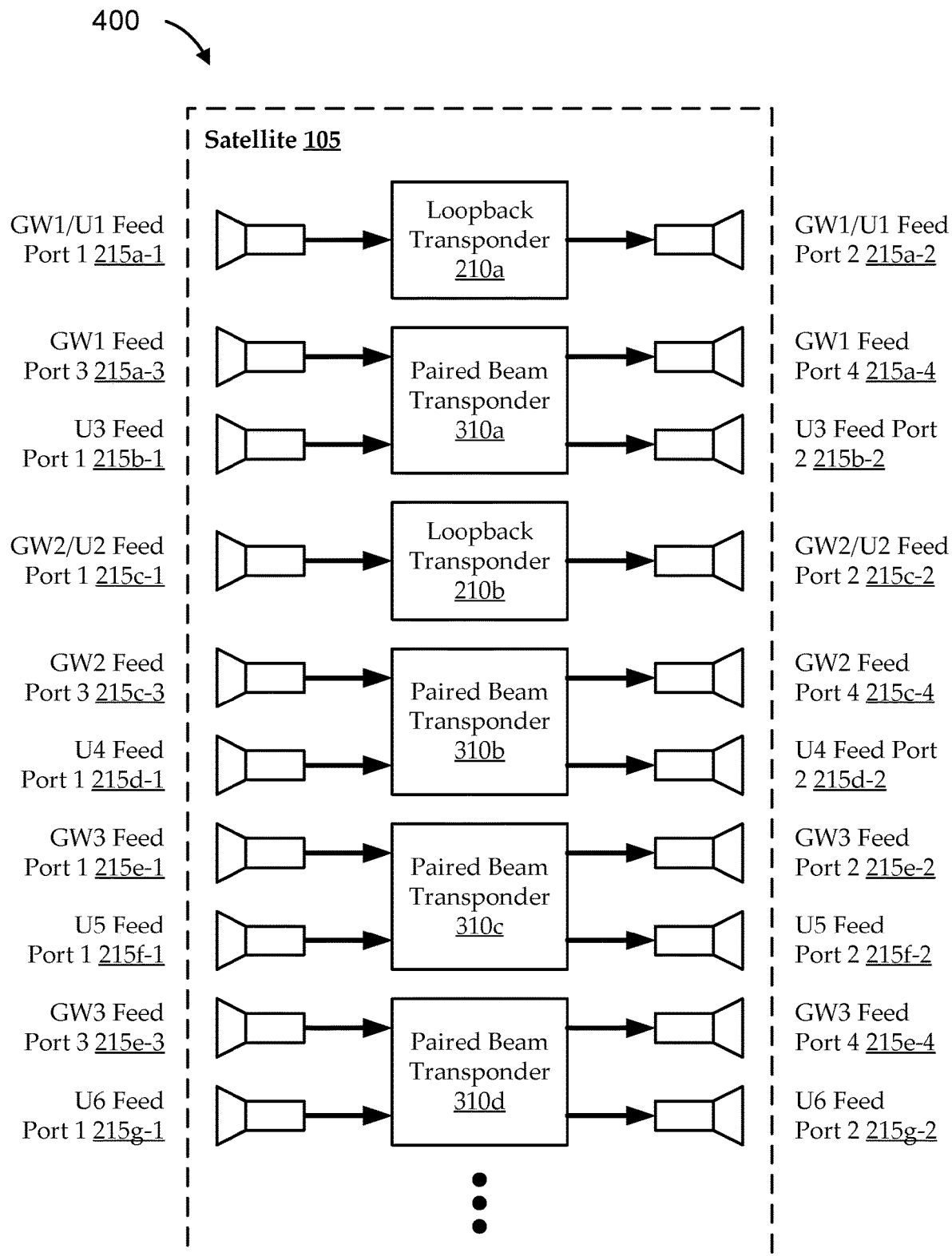
FIG. 4 shows a simplified block diagram of an illustrative partial satellite architecture having both loopback transponders and paired-beam transponders, according to various embodiments.

FIG. 4 shows a simplified block diagram of an illustrative partial satellite architecture 400 having both loopback transponders 210 and paired-beam transponders 310, according to various embodiments. The components for received and transmitting signals over the beams on the satellite are generally abstracted as feeds 215 to avoid over-complicating the description. For example, as described above, the feeds 215 can include antennas for reception and transmission of signals, each having a reflector with one or more feed horns for each user and/or gateway beam, and each having one or more ports for receiving and/or transmitting using one or more polarities. In the illustrated embodiment, it is assumed that each feed 215 has up to four ports, including a first port for receiving at a first polarization (e.g., right-hand circular polarization (RHCP)), a second port for transmitting at a second polarization (e.g., left-hand circular polarization (LHCP)), a third port for receiving at the second polarization, and a fourth port for transmitting at the first polarization. Each of a number of transponders is coupled between feed ports, so that, for example, a transponder receives signals from a gateway at an uplink frequency band in a first polarization and transmits signals to the gateway at a downlink frequency band in a second polarization. In other implementations, the receive and transmit sides of the transponder operate in the same polarization. The illustrated embodiment shows support for three gateway terminals 165 communicating with user terminals 110 in six spot beam coverage areas. Each gateway terminal 165 is assumed to have an antenna that can support communications in two polarities (e.g., RHCP and LHCP) with different sets of user terminals 110. Accordingly, the satellite 105 includes two feed ports to support communications with each gateway terminal 165.

In particular, as shown, a first port of a first feed 215a-1 and a second port of the first feed 215a-2 support communications between a first gateway terminal 165 ("GW1" denotes the gateway terminal 165 on beam 1) and user terminals in its own loopback beam coverage area ("U1" denotes the user terminals 110 on beam 1). The communications over the loopback beam are processed by a first loopback transponder 210a. For example, communications from GW1 and U1 are received at the first port of the first feed 215a-1 in RHCP, processed by the first loopback transponder 210a, and transmitted back to GW1 and U1 in LHCP.

Remaining ports of the first feed 215a and ports of a second feed 215b support communications between the same first gateway terminal 165 via a paired gateway beam and user terminals 110 in a paired user beam (in a different coverage area, denoted as "U3"). The paired-beam communications are processed by a first paired-beam transponder 310a. For example, communications from GW1 are received at the third port of the first feed 215a-3 in LHCP, processed by the first paired-beam transponder 310a, and transmitted to U3 via the second port of the second feed 215b-2 (e.g., in RHCP); and communications from U3 are received at the first port of the second feed 215b-1 (e.g., in LHCP), processed by the first paired-beam transponder 310a, and transmitted to GW1 via the fourth port of the first feed 215a-4 in RHCP.

A second gateway (GW2) operates in much the same manner as GW1. Two ports of a third feed 215c and a second loopback transponder 210b are used to support GW2 communications with one group of user terminals 110 (U2) in its own beam coverage area (i.e., via a loopback beam). The other two ports of the third feed 215c, two ports of a fourth feed 215d, and a second paired-beam transponder 310b are used to support GW2 communications with another group of user terminals 110 (U4) in a paired user beam (i.e., in a different beam coverage area). A third gateway (GW3) is configured to communicate via two different paired beams, and no loopback beam. For example, GW3 is located away from user terminals 110. Two ports of a fifth feed (315e-1 and 215e-2), two ports of a sixth feed (315f-1 and 215f-2), and a third paired-beam transponder 310c are used to support GW3 communications with one group of user terminals 110 (U5) in one paired user beam. The other two ports of the fifth feed (315e-3 and 215e-4), two ports of a seventh feed (315g-1 and 215g-2), and a fourth paired-beam transponder 310d are used to support GW3 communications with another group of user terminals 110 (U6) in another paired user beam. While a particular configuration (e.g., order and number) of loopback transponders 210 and paired-beam transponders 310 is shown, many configurations are possible without departing from the scope of embodiments.

FIGS. 1-4 illustrate various embodiments of satellite communications systems and related components and architectures for effectuating either or both of loopback communications and paired-beam communications. Implementations described above provide a number of features, including, for example, permitting flexible assignment of forward-channel and return-channel capacity, permitting spectrum reuse across certain beams and between gateway and user terminals, and similar transponder architectures between loopback and paired-beam types. Some embodiments provide further features supporting use of one or more utility gateway terminals 165 (e.g., alternate gateway terminals 165) in the event that one or more gateway terminals 165 becomes non-operational. For example, in the illustrative embodiment of FIG. 4, two groups of user terminals 110 (i.e., U1 and U3) rely on the first gateway terminal 165 (GW1) to service their communications. If GW1 "goes down" (e.g., becomes non-operational due to rain fade, equipment malfunction, or for any other reason), it can be desirable to effectively switch in a designated utility gateway in place of the down gateway. FIGS. 5-8B illustrate various embodiments that support utility gateway functionality.

Figure 5:
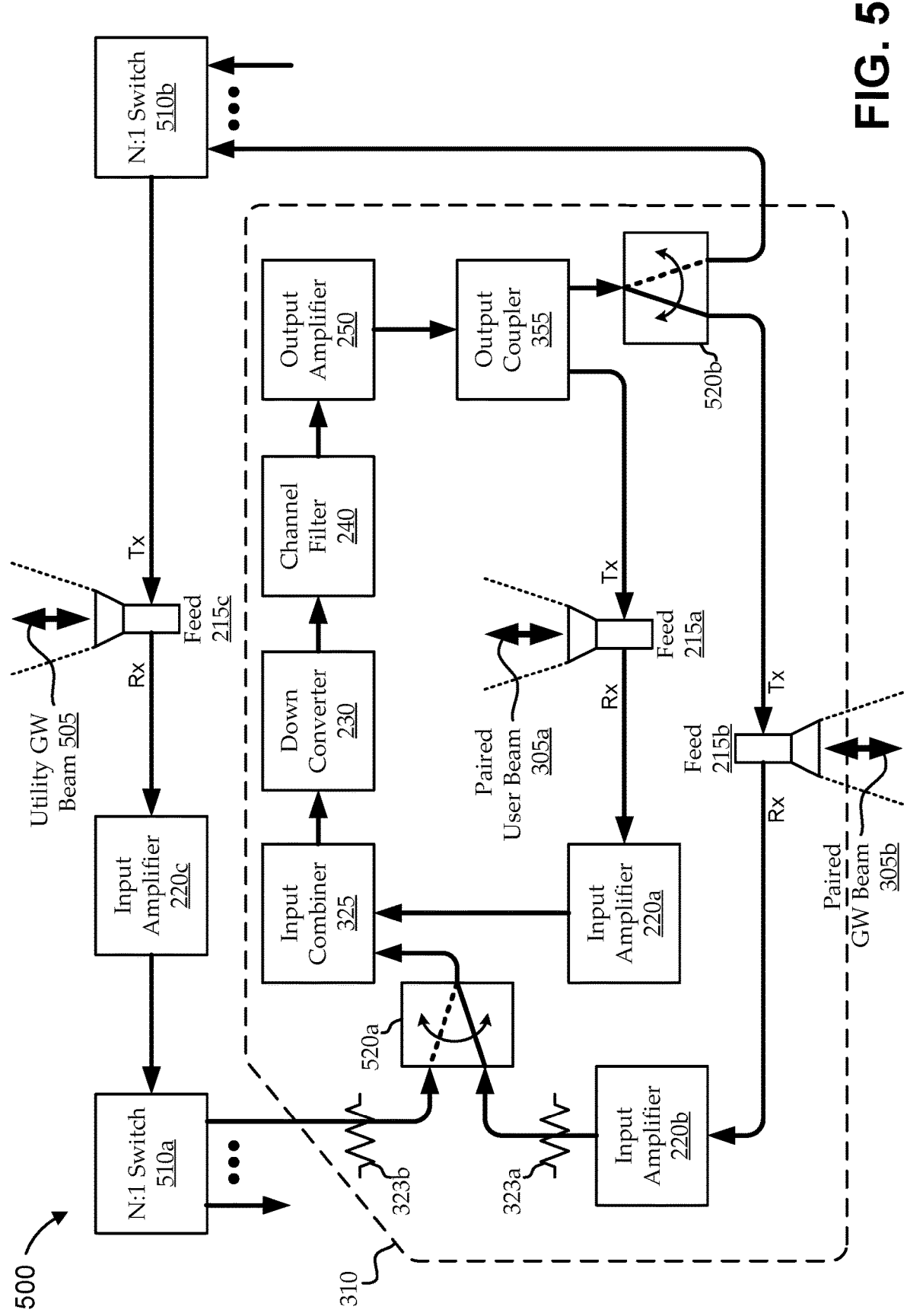
FIG. 5 shows an illustrative architecture of a paired-beam transponder that includes utility gateway support, according to various embodiments.

Turning to FIG. 5, an illustrative architecture 500 is shown including a paired-beam transponder 310 that includes utility gateway support, according to various embodiments. The illustrated paired-beam transponder architecture 500 is designed to select which of two gateway terminals 165 to use as the paired-beam gateway for a particular group of user terminals 110. In alternative embodiments, the selection can be between more than two gateway terminals 165 (e.g., to support multiple utility gateways or for any other suitable reason). The selection between a "normal" gateway terminal 165 and a utility gateway terminal 165 is performed by any suitable switching components (depicted as utility select switches 520a and 520b), such as electrical, electromechanical, and/or other switches. For example, a remote signal from a ground network component (e.g., a gateway or other component) can direct the utility select switches 520 to toggle between a "normal" mode and a "utility" mode. As illustrated, when the switches are in normal mode (indicated as the solid-line path in each utility select switch 520), the signal path is effectively that of the paired-beam transponders described above (the components that make up the normal mode transponder are indicated as paired-beam transponder 310).

While the components of the paired-beam transponder 310 are illustrated substantially as shown in FIG. 3A, other embodiments of a normal mode architecture can be used (e.g., the embodiment illustrated in FIG. 3B or some other architecture) without departing from the scope of embodiments.

In utility mode, the utility select switches 520 are toggled to their dashed-line configurations, effectively switching out the normal gateway signal received via feed 215b and switching in a utility gateway signal received via feed 215c (e.g., on a now-paired utility gateway beam 505). The gateway terminal 165 in communication with the satellite 105 via the utility gateway beam 505 can be a gateway terminal 165 that is otherwise in use for other communications or a gateway terminal 165 designated for use as a utility gateway. For example, the utility gateway terminal 165 can be a separate antenna on a gateway terminal 165 having other antenna used for "normal" communications, a separate dedicated gateway terminal 165 in a separate location, etc.

The utility gateway feed 215c can be coupled with its own input amplifier 220c (e.g., and its own input attenuator 323b, as appropriate). This can make the utility gateway signal path through the paired-beam architecture 500 look almost identical to the normal gateway signal path through the paired-beam transponder 310. Accordingly some or all of the other processing components (e.g., the input combiner 325, the down-converter 230, the channel filter 240, the output amplifier 250, and the output coupler 355 can be used without adding components or appreciably altering that portion of the architecture.

In some implementations, two "N:1" switches 510 are added to the utility gateway signal path (e.g., between the input amplifier 220c and the input attenuator 323 and/or the input-side utility select switch 520a). The N:1 switches 510 permit a single additional utility gateway feed 215c to act as an alternative gateway for any of up to N normal gateway terminals 165. For example, the utility gateway feed 215c is coupled with the input ("1") side of a 20:1 switch (as N:1 switch 510a), and each of twenty normal gateway terminals 165 is coupled to the output ("20") side of the switch. When a third normal gateway terminal 165 becomes non-operational, the N:1 switches 510 effectively couple the utility gateway feed 215c with the input signal path for the paired-beam transponder 310 that normally services the non-operational third gateway terminal 165, and the utility select switches 520 switch into utility mode. The additional outputs of N:1 switch 510a and the additional inputs of N:1 switch 510b can be coupled with other paired-beam transponders 310 that service the other gateway terminals 165. In alternative embodiments, two or more utility gateway terminals 165 are supported. In some such embodiments, the utility select switches 520 are configured to switch among more than two potential gateway input signal paths. In other such embodiments, the N:1 switches 510 are implemented as N:M switches, supporting up to M utility gateway terminals 165 as alternates for up to N normal gateway terminals 165.

For the sake of illustration, embodiments, like those described with reference to FIG. 5, can be used to implement various methods. When operating in normal mode, the operation of embodiments of FIG. 5 can be similar to those of FIG. 3A or 3B. An illustrative method begins by receiving an indication that the first gateway terminal is non-operational. In response to receiving the indication, the paired-beam transponder can switch to a utility mode. In the utility mode, a user uplink signal is received by the paired-beam transponder from a group of user terminals via the paired user beam on the uplink frequency band, and a utility gateway uplink signal is received from a second gateway terminal via a utility gateway beam on the uplink frequency band. The utility gateway uplink signal and the user uplink signal can be amplified and combined into a combined input signal, and the combined input signal can be converted to a combined output signal at a downlink frequency band that is different from the uplink frequency band. The combined output signal can be transmitted to the second gateway terminal via the utility gateway beam on the downlink frequency band. The combined output signal can be transmitted to the group of user terminals via the paired user beam on the downlink frequency band.

Figure 6A:
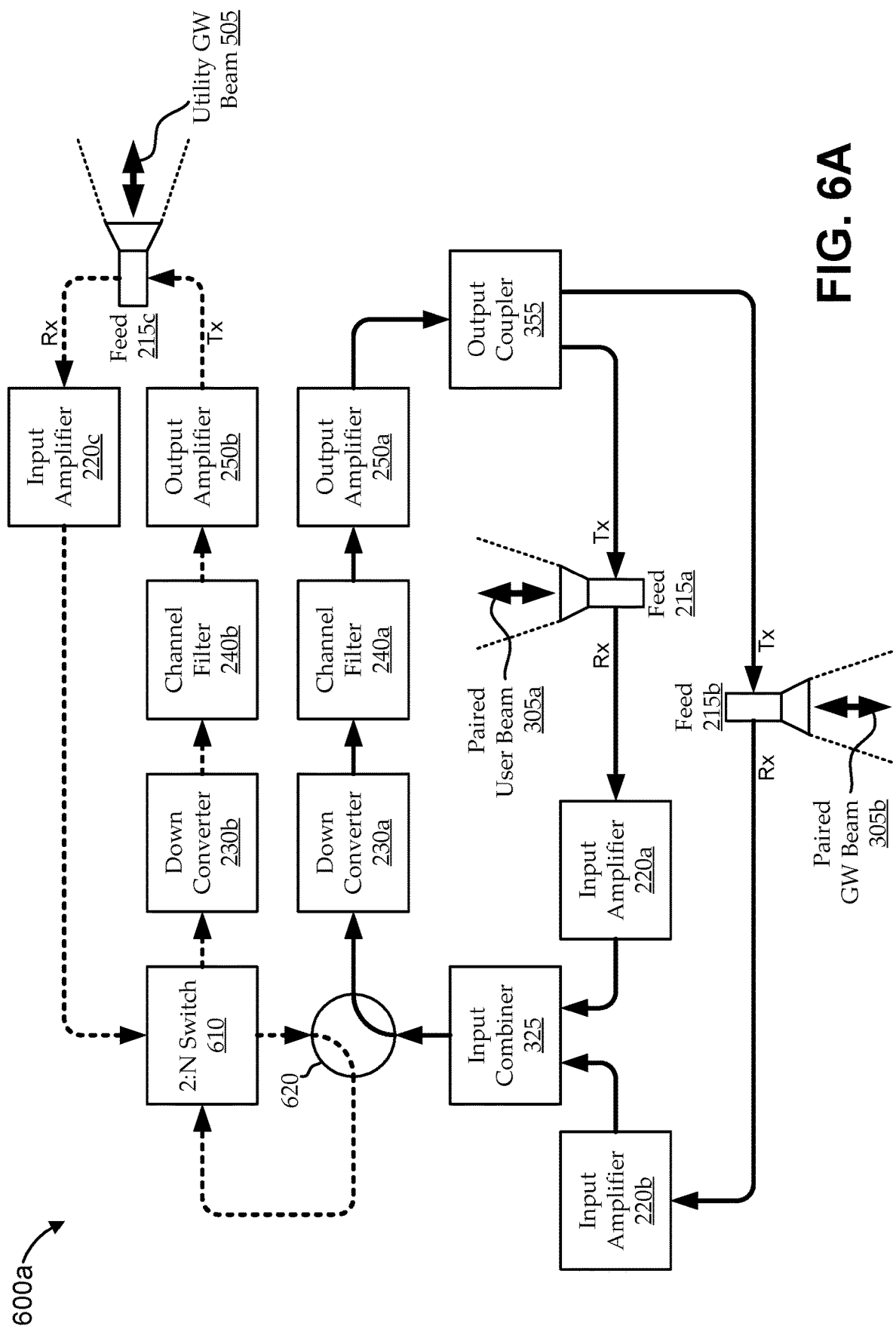
FIGS. 6A and 6B show two configurations of an alternate illustrative architecture of a paired-beam transponder that includes utility gateway support, according to various embodiments.
Figure 6B:
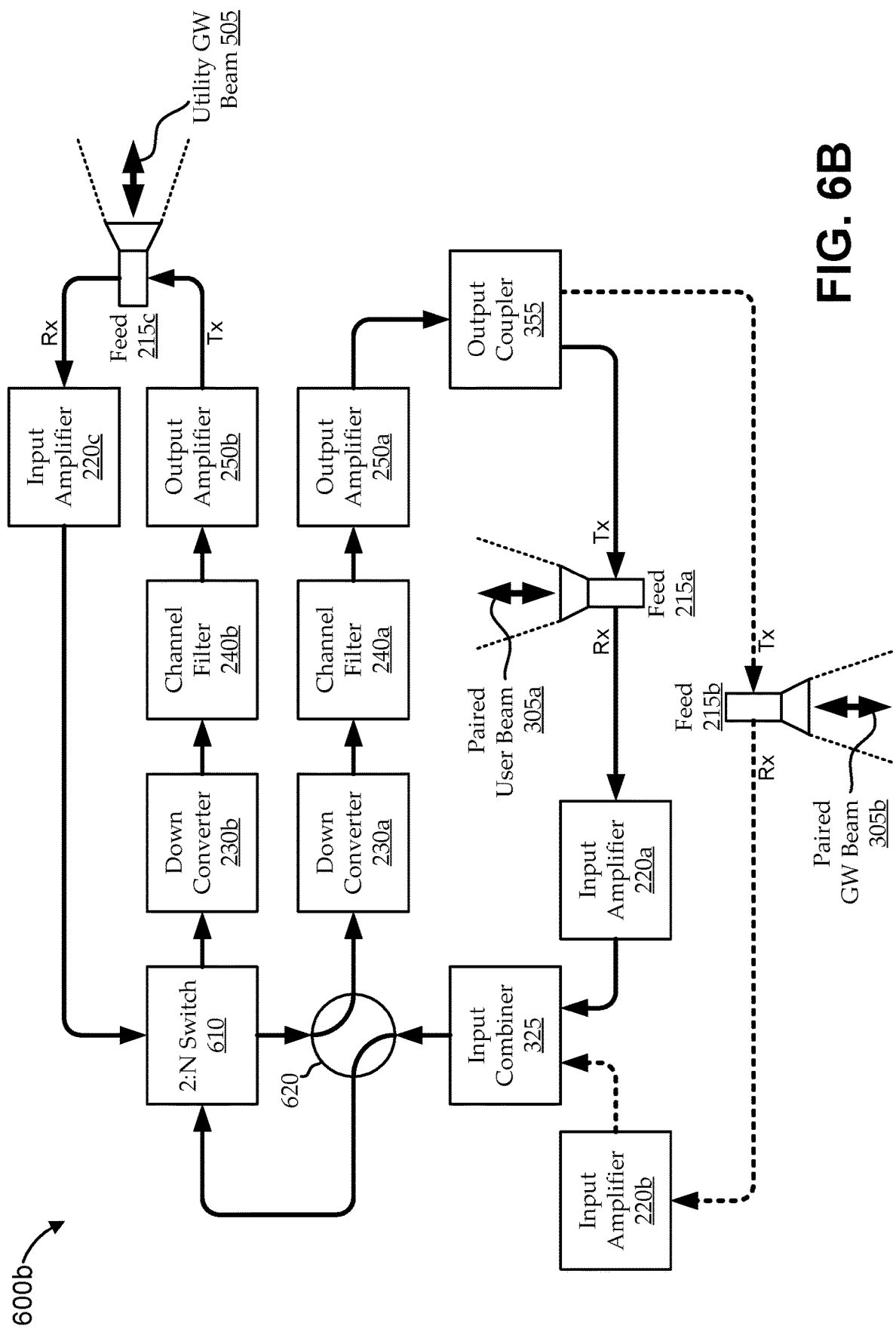

FIGS. 6A and 6B show two configurations of an alternate illustrative architecture of a paired-beam transponder 600 that includes utility gateway support, according to various embodiments. The illustrated paired-beam transponder 600 is designed to select which of two gateway terminals 165 to use as the paired-beam gateway for a particular group of user terminals 110 using a "baseball switch" 620. As used herein, a "baseball switch" can be any suitable type of signal switch, including, for example, an electromagnetic "C" switch, radiofrequency "R" or "T" switch, solid-state switch, ferrite switch, etc. The solid signal path indicates the active signal path (e.g., normal mode using the normal paired gateway beam 305b input signal is shown in FIG. 6A) with the baseball switch 620 in its illustrated configuration. The dashed signal path indicates an inactive signal path (e.g., the input signal path coming from the utility gateway feed 215c is not currently being used in the configuration of FIG. 6A) with the baseball switch 620 in its illustrated configuration. When the baseball switch 620 is in the normal mode configuration illustrated in FIG. 6A, the architecture of the paired-beam transponder 600 is effectively that of the paired-beam transponder 310a of FIG. 3A and the normal mode configuration of the transponder architecture 500 of FIG. 5. For example, the normal gateway input signal and user input signals are received at respective feeds 215, amplified and combined by input components (e.g., respective input amplifiers 220, an input combiner 325, an input attenuator (not shown), etc.), processed by filter block and/or other components (e.g., a down-converter 230, a channel filter 240, etc.), and prepared for output by output components (e.g., an output amplifier 250, an output coupler 355, etc.). Other embodiments of the normal mode architecture can be used without departing from the scope of embodiments.

The utility components of the architecture are described with reference to FIG. 6B. In FIG. 6B, the baseball switch 620 is in its utility configuration. As shown by the solid and dashed signal paths, the normal gateway signal path is now inactive, and the utility gateway signal path is now active. The user input signal is received via the paired user beam 305a at the user feed 215a and is amplified by input amplifier 220a. The signal can then be passed through the input combiner 325, which effectively acts as a pass-through (though it may alter the signal to some extent) as there is no normal gateway input signal in this state with which to combine the user input signal (i.e., it is assumed that no signal is being received from the non-operational gateway terminal 165). The signal then passes through the baseball switch 620 to a "2:N" switch 610. The 2:N switch 610 can include any components of one or more switches configured to couple each of two inputs with any of N outputs. The 2:N switch 610 allows the utility gateway feed 215c to be switched into a paired-beam transponder 600 associated with any of N potentially non-operational gateway terminals 165. Similarly, the utility gateway input signal is received via the now-paired utility gateway beam 505 at the utility gateway feed 215c, is amplified by input amplifier 220c, and is passed to the 2:N switch 610.

Rather than combining the user and utility gateway signals (e.g., as in FIG. 5), each signal follows a respective (e.g., substantially identical) signal processing path. For example, the amplified user signal is processed by a set of utility filter block and/or other components (e.g., down-converter 230b and channel filter 240b), and prepared for output to the utility gateway terminal 165 by a utility output amplifier 250b. The processed user signal can be communicated to the utility gateway terminal 165 via the utility gateway feed 215c and the now-paired utility gateway beam 505. Similarly, the amplified utility gateway signal is processed by the set of normal filter block and/or other components (e.g., down-converter 230a and channel filter 240a), and prepared for output to the user terminals 110 by the normal output amplifier 250a. The processed utility gateway signal can be communicated to the user terminals 110 via the user feed 215a and the paired user beam 305a.

For the sake of illustration, embodiments, like those described with reference to FIGS. 6A and 6B, can be used to implement various methods. When operating in normal mode, the operation of embodiments of FIGS. 6A and 6B can be similar to those of FIG. 3A or 3B. An illustrative method begins by receiving an indication that the first gateway terminal is non-operational and switching to a utility mode in response to receiving the indication. In the utility mode, a user uplink signal is received by a normal input subsystem (e.g., input amplifier 220a and input combiner 325) from a first group of user terminals via the paired user beam on the uplink frequency band. A utility gateway uplink signal is received by a utility input subsystem (e.g., input amplifier 220c) from a second gateway terminal via a utility gateway beam on the uplink frequency band. The user uplink signal is amplified by the normal input subsystem, and the utility gateway uplink signal is amplified by the utility input subsystem. The amplified user uplink signal can be converted to a user output signal at the downlink frequency band by a utility frequency translation subsystem (e.g., down converter 230b and channel filter 240b), and the user output signal can be transmitted by a utility output subsystem (e.g., output amplifier 250b) to the second gateway terminal via the utility gateway beam on the downlink frequency band. The amplified utility gateway uplink signal can be converted to a utility gateway output signal at the downlink frequency band by a normal frequency translation subsystem (e.g., down converter 230a and channel filter 240a), and the utility gateway output signal can be transmitted by a normal output subsystem (e.g., output amplifier 250a) to the first group of user terminals via the paired user beam on the downlink frequency band.

Figure 7A:
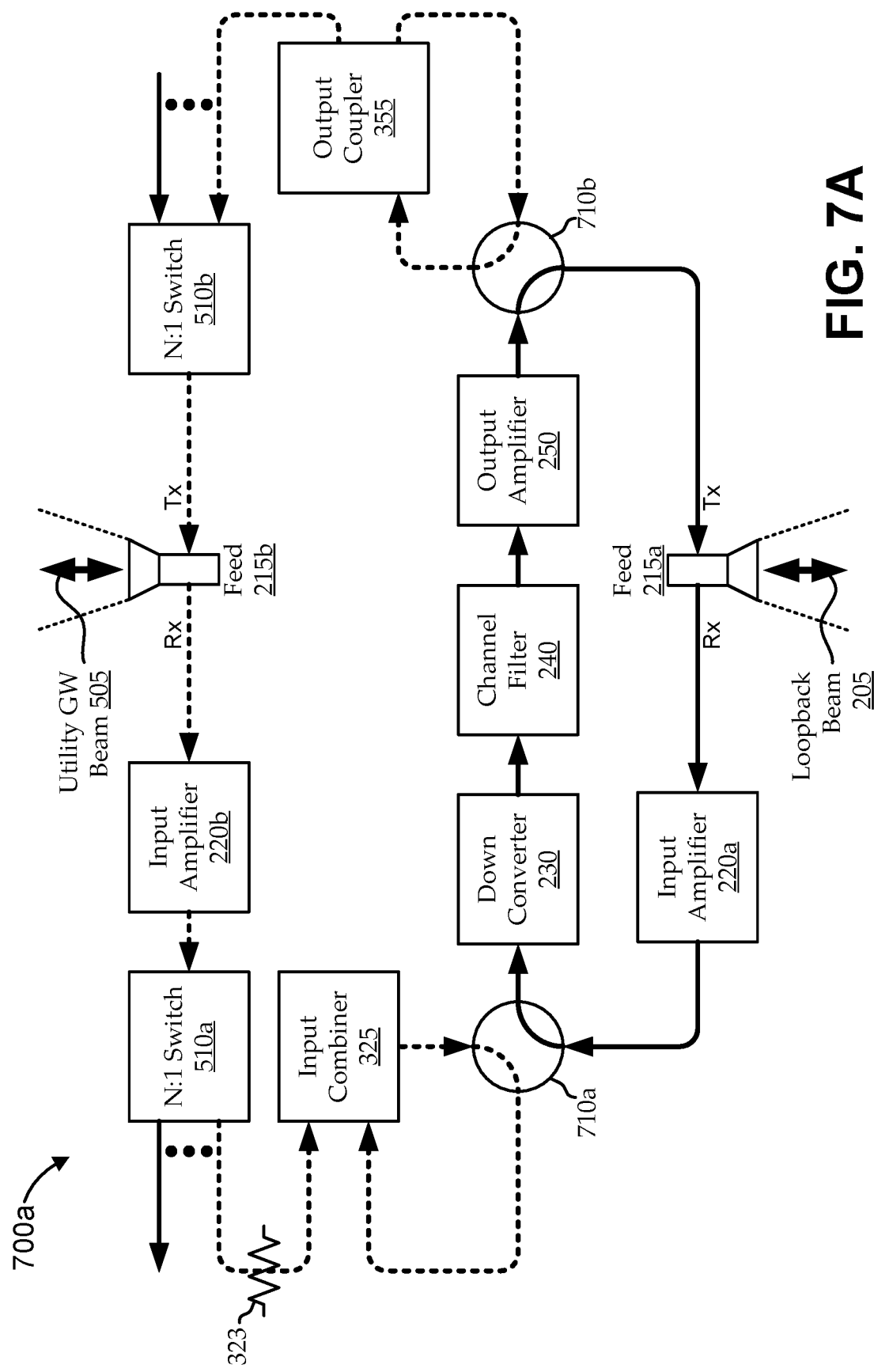
FIGS. 7A and 7B show two configurations of an illustrative architecture of a loopback transponder that includes utility gateway support, according to various embodiments.
Figure 7B:
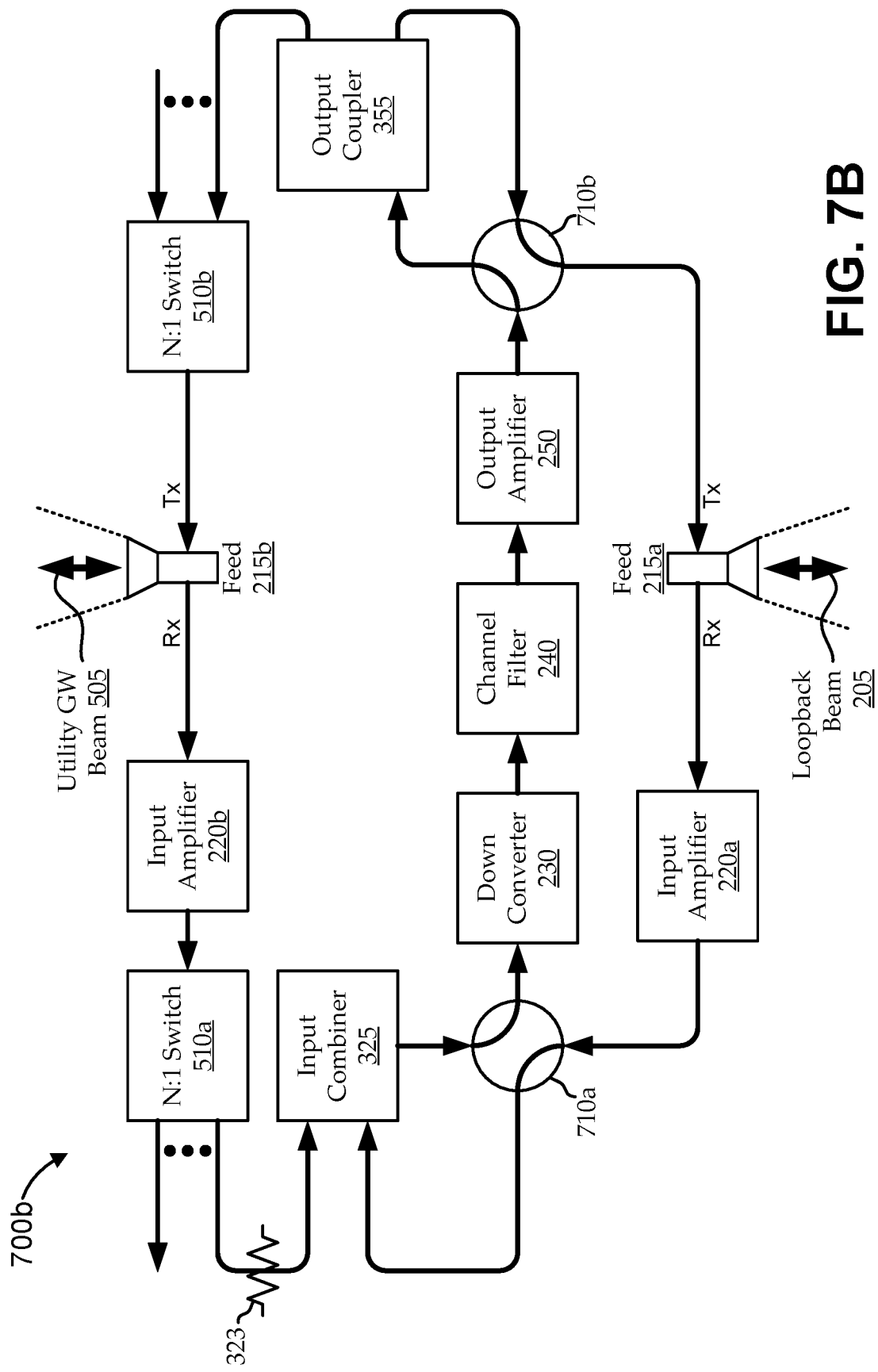

FIGS. 7A and 7B show two configurations of an illustrative architecture of a loopback transponder 700 that includes utility gateway support, according to various embodiments. The illustrated loopback transponder 700 is designed to select which of two gateway terminals 165 to use as the loopback gateway for a particular group of user terminals 110 using a pair of baseball switches 710. The solid signal path indicates the active signal path (e.g., normal mode using the loopback beam 205 input signal is illustrated in FIG. 7A) with the baseball switches 710 in their illustrated configuration. The dashed signal path indicates an inactive signal path (e.g., the input signal path coming from the utility gateway feed 215b is not currently being used in the configuration illustrated in FIG. 7A) with the baseball switches 710 in their illustrated configuration. When the baseball switches 710 are in the normal mode configuration illustrated in FIG. 7A, the architecture of the loopback transponder 700 is effectively that of the loopback transponder 210 of FIG. 2. When the baseball switches 710 are in the utility configuration illustrated in FIG. 7B, the architecture of the loopback transponder 700 is effectively that of the paired-beam transponder 310a of FIG. 3A.

For example, according to the active signal path of FIG. 7A, the normal gateway input signal and user input signals are both received at feed 215a, amplified by an input amplifier 220a, passed through the input-side baseball switch 710a to filter block and/or other components (e.g., a down-converter 230, a channel filter 240, etc.), prepared for output by output amplifier 250, and passed to the feed 215a for transmission back over the loopback beam 205. Other embodiments of the normal mode architecture can be used without departing from the scope of embodiments. The active signal path shown in FIG. 7B includes separate (i.e., paired in utility mode) user and gateway beams and respective feeds 215. Embodiments receive the user input signal via the loopback beam 205 and the first feed 215a, and receive the utility gateway signal via the utility gateway beam 505 and a utility gateway feed 215b. Both signals are amplified by respective input amplifiers 220 and passed (e.g., directly for the gateway input signal, and through the input-side baseball switch 710a for the user input signal) to an input combiner 325. In some embodiments, as described above, N:1 switches 510 can be used to facilitate selection between the utility gateway signal path and the loopback beam 205 associated with any of N potentially non-operational gateway terminals 165. The combined signal is passed (e.g., through another path of the input-side baseball switch 710a) to the down-converter 230, channel filter 240, and output amplifier 250. The output-side baseball switch 710b passes the signal through an output coupler 355 to further prepare the signal to be sent individually (e.g., at different power levels as set by the directivity of the output coupler 355) to the user terminals 110 and the utility gateway terminal 165 through their respective feeds 215 and beams. Using the two baseball switches 710 permits embodiments to share many of the active components (e.g., the down-converter 230, channel filter 240, and output amplifier 250), which can save the design from providing dedicated instances of those components for the utility gateway signal path.

For the sake of illustration, embodiments, like those described with reference to FIGS. 7A and 7B, can be used to implement various methods. When operating in normal mode, the operation of embodiments of FIGS. 7A and 7B can be similar to those of FIG. 2. An illustrative method begins by receiving an indication that the first gateway terminal is non-operational and switching to a utility mode in response. In the utility mode, a user uplink signal is received by the loopback transponder from a group of user terminals via the loopback beam on the uplink frequency band, and a utility gateway uplink signal is received from a second gateway terminal via a utility gateway beam on the uplink frequency band. The utility gateway uplink signal and the user uplink signal are combined into a combined input signal. The combined input signal can be converted to a combined output signal at the downlink frequency band. The combined output signal can be transmitted to the second gateway terminal via the utility gateway beam on the downlink frequency band, and can be transmitted to the group of user terminals via the loopback beam on the downlink frequency band.

Figure 8A:
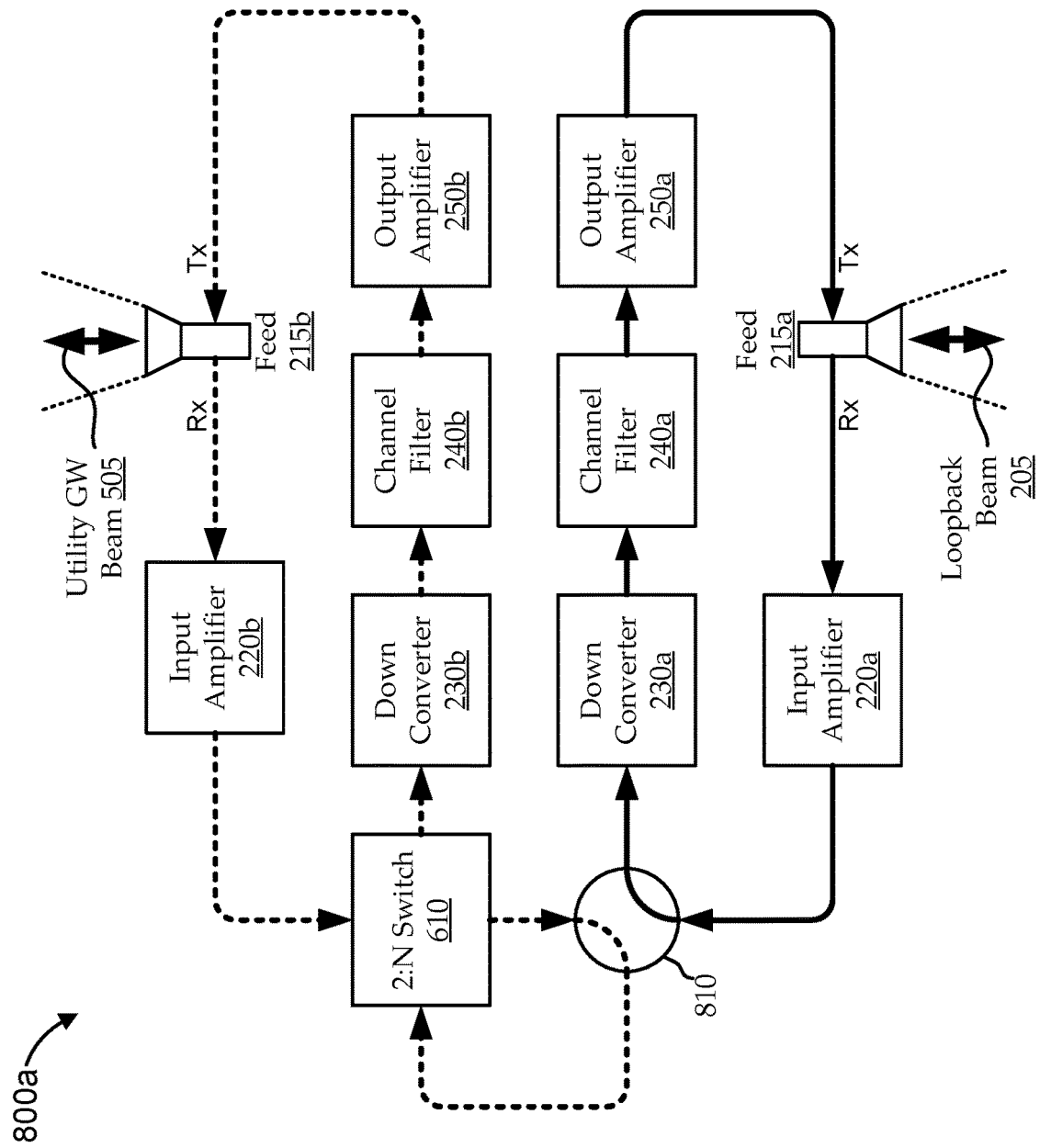
FIGS. 8A and 8B show two configurations of an alternative illustrative architecture of a loopback transponder that includes utility gateway support, according to various embodiments.
Figure 8B:
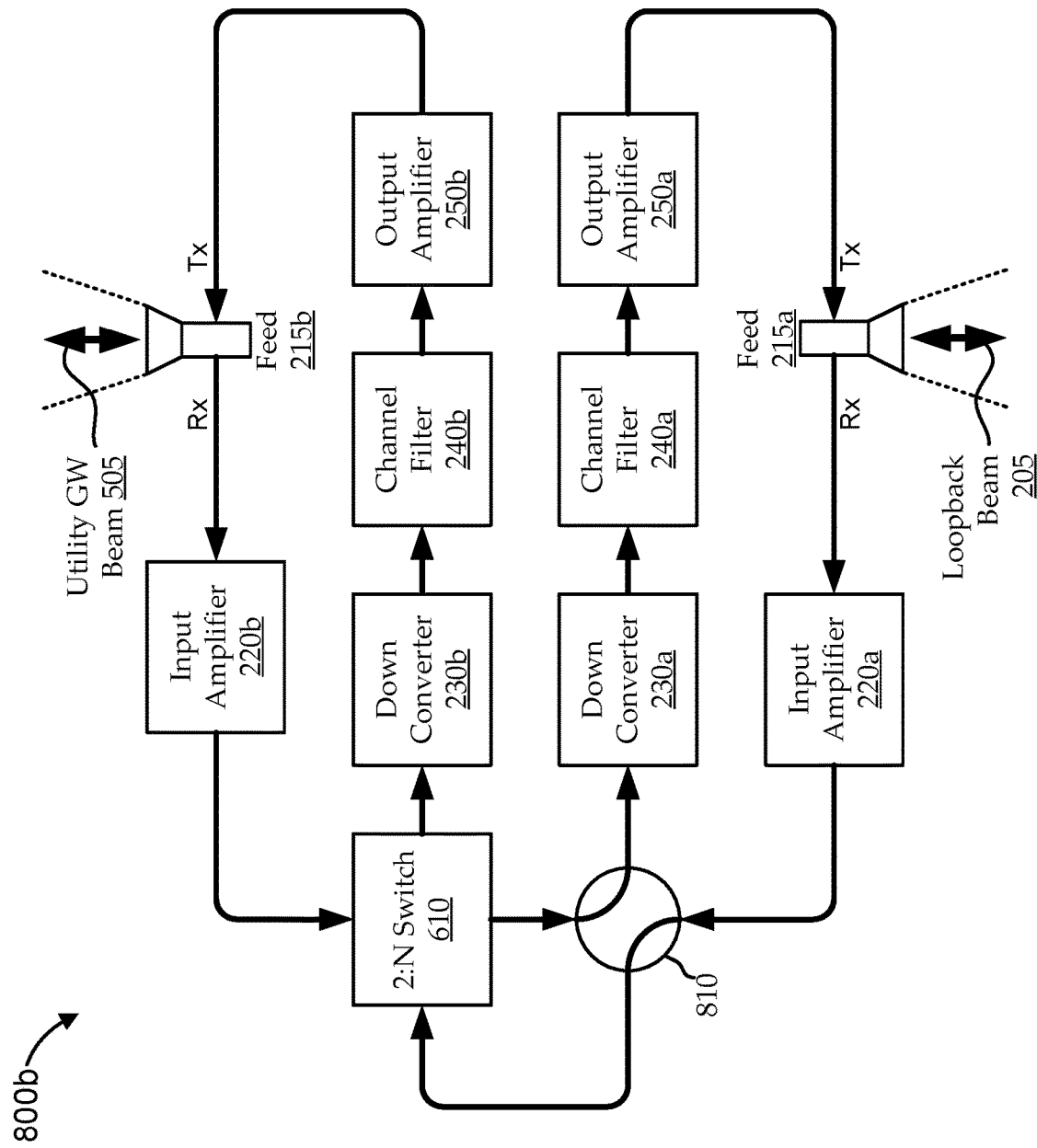

FIGS. 8A and 8B show two configurations of an alternative illustrative architecture of a loopback transponder 800 that includes utility gateway support, according to various embodiments. The illustrated loopback transponder 800 is designed to select which of two gateway terminals 165 to use as the loopback gateway for a particular group of user terminals 110 using a single baseball switch 810. The solid signal path indicates the active signal path (e.g., normal mode using the loopback beam 205 input signal is illustrated in FIG. 8A) with the baseball switch 810 in its illustrated configuration. The dashed signal path indicates an inactive signal path (e.g., the input signal path coming from the utility gateway feed 215b is not currently being used in the configuration illustrated in FIG. 8A) with the baseball switch 810 in its illustrated configuration. When the baseball switch 810 is in the normal mode configuration illustrated in FIG. 8A, the architecture of the loopback transponder 800 is effectively that of the loopback transponder 210 of FIG. 2 or the normal mode configuration of the loopback transponder 700 of FIG. 7A. When the baseball switch 810 is in the utility configuration illustrated in FIG. 8B, the architecture of the loopback transponder 800 is effectively that of the utility mode configuration of the paired-beam transponder 600b of FIG. 6B.

For example, according to the active signal path of FIG. 8A, the normal gateway input signal and user input signals are both received at feed 215a, amplified by an input amplifier 220a, passed through the baseball switch 810 to filter block and/or other components (e.g., a down-converter 230, a channel filter 240, etc.), prepared for output by output amplifier 250, and passed to the feed 215a for transmission back over the loopback beam 205. Other embodiments of the normal mode architecture can be used without departing from the scope of embodiments. The active signal path shown in FIG. 8B includes separate (i.e., paired in utility mode) user and gateway beams and respective feeds 215. Embodiments receive the user signal via the loopback beam 205 and the first feed 215a, and receive the utility gateway signal via the utility gateway beam 505 and a utility gateway feed 215b. Both signals are amplified by respective input amplifiers 220. In some embodiments, as described above, the signals can then pass through a "2:N" switch 610 to facilitate selection between the utility gateway signal path and the loopback beam 205 associated with any of N potentially non-operational gateway terminals 165. As shown, the amplified gateway input signal is passed directly to the 2:N switch 610, and the amplified user input signal is passed to the 2:N switch 610 via the baseball switch 810.

Rather than combining the user and utility gateway signals, each signal follows a respective (e.g., substantially identical) signal processing path. For example, the amplified user signal is processed by a set of utility filter block and/or other components (e.g., down-converter 230b and channel filter 240b), and prepared for output to the utility gateway terminal 165 by a utility output amplifier 250b. The processed user signal can be communicated to the utility gateway terminal 165 via the utility gateway feed 215c and the now-paired utility gateway beam 505. Similarly, the amplified utility gateway signal is processed by the set of normal filter block and/or other components (e.g., down-converter 230a and channel filter 240a), and prepared for output to the user terminals 110 by the normal output amplifier 250a. The processed utility gateway signal can be communicated to the user terminals 110 via the user feed 215a and the loopback beam 205.

For the sake of illustration, embodiments, like those described with reference to FIGS. 8A and 8B, can be used to implement various methods. When operating in normal mode, the operation of embodiments of FIGS. 8A and 8B can be similar to those of FIG. 2. An illustrative method begins by receiving an indication that the first gateway terminal is non-operational and switching to a utility mode in response. In the utility mode, a user uplink signal is received by a normal input subsystem (e.g., input amplifier 220a) from a group of user terminals via the loopback beam on the uplink frequency band, and a utility gateway uplink signal is received by a utility input subsystem (e.g., input amplifier 220b) from a second gateway terminal via a utility gateway beam on the uplink frequency band. The user uplink signal is amplified by the normal input subsystem, and the utility gateway uplink signal is amplified by the utility input subsystem. The amplified user uplink signal can be converted to a user output signal at the downlink frequency band by a utility filter subsystem (e.g., down converter 230b and channel filter 240b), and the user output signal can be transmitted by a utility output subsystem (e.g., output amplifier 250b) to the second gateway terminal via the utility gateway beam on the downlink frequency band. The amplified utility gateway uplink signal can be converted to a utility gateway output signal at the downlink frequency band by the normal filter subsystem (e.g., down converter 230a and channel filter 240a), and the utility gateway output signal can be transmitted by the normal output subsystem (e.g., output amplifier 250a) to the group of user terminals via the paired user beam on the downlink frequency band.

As described above, embodiments of the loopback and paired-beam transponders are designed to use similar components. Accordingly, redundancy rings and/or other architectures can be used to provide redundant active components (e.g., input amplifiers 320, down-converters 330, channel filters 340, output amplifiers 350, etc.) for either or both types of transponder. For example, in a satellite architecture that includes both types of transponder, like the one illustrated in FIG. 4, a set of redundant components can be used across multiple transponders of different types.

In some embodiments, some or all of the spare components can be designated as "active spares." Implementations of loopback transponders 310 and paired-beam transponders 410 that have utility gateway support can be implemented with spare components that are designated for use by the utility gateway signal path, when operating in utility mode, as described above. For example, FIGS. 6A, 6B, 8A, and 8B show embodiments of transponders for which, in utility mode, a set of active utility components is switched into a signal path of the transponder. Some or all of these utility components can be implemented as an active spare component: when a transponder is operating in normal mode, the active spare component is available (e.g., in a redundancy ring) for use as a spare component by being switched into a normal signal path of the transponder; and when the transponder is operating in utility mode, the active spare component is available (e.g., in the same redundancy ring, via a dedicated signal path) for use as a utility component by being switched into a utility signal path. In some embodiments, the spare components are arranged to provide components that are usable only as normal spares (they do not have a dedicated signal path for use by a utility gateway) for normal components (they can only be switched into the normal signal path of a transponder), as active spares (they have a dedicated signal path for use by a utility gateway), as normal spares for active spares (they can be switched into the utility signal path of a transponder when the active spare fails), etc.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions. These means can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A satellite comprising:
a plurality beam feeds, each having a plurality of ports;
a loopback transponder comprising:
  a first input subsystem coupled with a first port of a first beam feed of the plurality of beam feeds to receive a loopback uplink signal via a loopback beam at a first polarization; and
  a first output subsystem coupled with a second port of the first beam feed to transmit, responsive to receiving the loopback uplink signal, a corresponding loopback downlink signal via the loopback beam at a second polarization that is orthogonal to the first polarization; and
a paired-beam transponder comprising:
  a second input subsystem coupled with a third port of the first beam feed to receive a first paired uplink signal via a first paired beam at the second polarization, the second input subsystem being further coupled with a first port of a second beam feed of the plurality of beam feeds to receive a second paired uplink signal via a second paired beam at a third polarization,
  wherein the first paired beam and the loopback beam are both associated with a first spot beam coverage area, the second paired beam is associated with a second spot beam coverage area that does not overlap with the first spot beam coverage area, and the third polarization is one of the first polarization or the second polarization; and
  a second output subsystem coupled with a second port of the second beam feed to transmit, responsive to receiving the first paired uplink signal and the second paired uplink signal, a corresponding paired downlink signal via the second paired beam at a fourth polarization that is orthogonal to the third polarization, the second output subsystem being further coupled with a fourth port of the first beam feed to transmit, responsive to receiving the first paired uplink signal and the second paired uplink signal, the corresponding paired downlink signal via the first paired beam at the first polarization.

2. The satellite of claim 1, wherein:
the second input subsystem is further to amplify and combine the first paired uplink signal and the second paired uplink signal into a combined input signal; and
the corresponding paired downlink signal is generated from the combined input signal.

3. The satellite of claim 2, wherein:
the first paired uplink signal and the second paired uplink signal are received concurrently; and
the first paired uplink signal and the second paired uplink signal are combined non-coherently.

4. The satellite of claim 2, wherein:
the first paired uplink signal and the second paired uplink signal are received in an uplink frequency band; and
the second input subsystem further comprises a frequency translation subsystem to convert the combined input signal to the corresponding paired downlink signal in a downlink frequency band that is different from the uplink frequency band.

5. The satellite of claim 1, wherein the second output subsystem further comprises:
an output amplifier and a passive coupler configured to apply a first gain to the corresponding paired downlink signal prior to transmitting via the first paired beam, and to apply a second gain to the corresponding paired downlink signal prior to transmitting via the second paired beam, the first gain being different from the second gain.

6. The satellite of claim 1, wherein:
the first polarization and the fourth polarization are right-hand circular polarization; and
the second polarization and the third polarization are left-hand circular polarization.

7. The satellite of claim 1, wherein:
the first spot beam coverage area has a gateway terminal located therein;
the second spot beam coverage area has a first plurality of user terminals located therein;
the first paired beam is a paired gateway beam, such that the second input subsystem is to receive the first paired uplink signal as a gateway uplink signal from the gateway terminal, and the second output subsystem is to transmit the corresponding paired downlink signal via the first paired beam as a gateway downlink signal to the gateway terminal; and
the second paired beam is a paired user beam, such that the second input subsystem is to receive the second paired uplink signal as a user uplink signal from the first plurality of user terminals, and the second output subsystem is to transmit the corresponding paired downlink signal via the second paired beam as a user downlink signal to the first plurality of user terminals.

8. The satellite of claim 7, wherein the second input subsystem further comprises:
an input combiner to combine the gateway uplink signal and the user uplink signal into a combined input signal, the corresponding paired downlink signal being generated from the combined input signal; and
an input attenuator configured to attenuate the gateway uplink signal prior to the combining by the input combiner.

9. The satellite of claim 7, wherein:
the first spot beam coverage area further has a second plurality of user terminals located therein;
the first input subsystem is to receive the loopback uplink signal as a combination of uplink signals from the gateway terminal and the second plurality of user terminals; and
the first output subsystem is to transmit the corresponding loopback downlink signal to the gateway terminal and the second plurality of user terminals.

10. The satellite of claim 9, wherein:
the first input subsystem is to receive the loopback uplink signal from the gateway terminal and the second plurality of user terminals as a combined uplink signal having a ratio of forward-channel traffic to return-channel traffic according to a flexible allocation of forward-channel and return-channel portions of an uplink frequency band and a downlink frequency band; and
the first output subsystem is to transmit the corresponding loopback downlink signal to the gateway terminal and the second plurality of user terminals as a combined downlink signal comprising the ratio of forward-channel traffic to return-channel traffic according to the flexible allocation.

11. The satellite of claim 1, further comprising:
a plurality of paired-beam transponders including the paired-beam transponder; and
a plurality of loopback transponders including the loopback transponder.

12. A method comprising:
receiving, by a first input subsystem of a loopback transponder of a satellite via a first port of a first beam feed of a plurality of beam feeds of the satellite, a loopback uplink signal communicated via a loopback beam at a first polarization;
transmitting, by a first output subsystem of the loopback transponder via a second port of the first beam feed, responsive to the receiving the loopback uplink signal, a corresponding loopback downlink signal for communication via the loopback beam at a second polarization that is orthogonal to the first polarization;
receiving, by a second input subsystem of a paired-beam transponder of the satellite via a third port of the first beam feed, a first paired uplink signal communicated via a first paired beam at the second polarization;
receiving, by the second input subsystem via a first port of a second beam feed of the plurality of beam feeds, a second paired uplink signal communicated via a second paired beam at a third polarization,
wherein the first paired beam and the loopback beam are both associated with a first spot beam coverage area, the second paired beam is associated with a second spot beam coverage area that does not overlap with the first spot beam coverage area, and the third polarization is one of the first polarization or the second polarization;
transmitting, by a second output subsystem of the paired-beam transponder via a second port of the second beam feed, responsive to the receiving the first paired uplink signal and the receiving the second paired uplink signal, a corresponding paired downlink signal communicated via the second paired beam at a fourth polarization that is orthogonal to the third polarization; and
transmitting, by the second output subsystem of the paired-beam transponder via a fourth port of the first beam feed, responsive to the receiving the first paired uplink signal and the receiving the second paired uplink signal, the corresponding paired downlink signal communicated via the first paired beam at the first polarization.

13. The method of claim 12, further comprising:
responsive to the receiving the first paired uplink signal and the receiving the second paired uplink signal, amplifying and combining the first paired uplink signal and the second paired uplink signal into a combined input signal; and generating the corresponding paired downlink signal from the combined input signal.

14. The method of claim 13, wherein:
the first paired uplink signal and the second paired uplink signal are received in an uplink frequency band; and
the generating comprises converting the combined input signal to the corresponding paired downlink signal in a downlink frequency band that is different from the uplink frequency band.

15. The method of claim 12, further comprising:
applying a first gain to the corresponding paired downlink signal prior to the transmitting by the second output subsystem via the second port of the second beam feed; and
applying a second gain to the corresponding paired downlink signal prior to the transmitting by the second output subsystem via the fourth port of the first beam feed, the first gain being different from the second gain.

16. The method of claim 12, further comprising:
the first polarization and the fourth polarization are right-hand circular polarization; and
the second polarization and the third polarization are left-hand circular polarization.

17. The method of claim 12, wherein:
the first paired beam is a paired gateway beam, such that the first paired uplink signal is received by the second input subsystem as a gateway uplink signal from a gateway terminal, and the corresponding paired downlink signal is transmitted by the second output subsystem via the fourth port of the first beam feed as a gateway downlink signal to the gateway terminal; and
the second paired beam is a paired user beam, such that the second paired uplink signal is received by the second input subsystem as a user uplink signal from a first plurality of user terminals, and the corresponding paired downlink signal is transmitted by the second output subsystem via the second port of the second beam feed as a user downlink signal to the first plurality of user terminals.

18. The method of claim 17, further comprising:
attenuating the gateway uplink signal, relative to the user uplink signal, to generate an attenuated gateway uplink signal;
combining the attenuated gateway uplink signal and the user uplink signal into a combined input signal; and
generating the corresponding paired downlink signal from the combined input signal.

19. The method of claim 17, wherein:
the receiving by the first input subsystem comprises receiving the loopback uplink signal as a combination of uplink signals from the gateway terminal and a second plurality of user terminals that is in a same spot beam coverage area as the gateway terminal; and
the transmitting by the first output subsystem comprises transmitting the corresponding loopback downlink signal to the gateway terminal and the second plurality of user terminals.

20. The method of claim 19, wherein:
the combination of uplink signals is received as having a ratio of forward-channel traffic to return-channel traffic according to a flexible allocation of forward-channel and return-channel portions of an uplink frequency band and a downlink frequency band; and
the transmitting by the first output subsystem comprises transmitting the corresponding loopback downlink signal as a combined downlink signal comprising the ratio of forward-channel traffic to return-channel traffic according to the flexible allocation.

* * * * *